(12) United States Patent
Suzuki

(10) Patent No.: US 6,614,997 B2
(45) Date of Patent: Sep. 2, 2003

(54) CAMERA HAVING AN OPTICAL ZOOM SYSTEM

(75) Inventor: Takashi Suzuki, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 10/047,049

(22) Filed: Jan. 14, 2002

(65) Prior Publication Data
US 2002/0122665 A1 Sep. 5, 2002

(30) Foreign Application Priority Data
Jan. 15, 2001 (JP) .................................... 2001-006815

(51) Int. Cl.[7] ................................................ G03B 17/00
(52) U.S. Cl. ........................................... 396/86; 396/87
(58) Field of Search ................................ 396/72, 85, 86, 396/87, 134

(56) References Cited

U.S. PATENT DOCUMENTS

| | | | |
|---|---|---|---|
| 5,257,053 A | * | 10/1993 | Kobayashi et al. ............ 396/87 |
| 5,287,137 A | * | 2/1994 | Hara et al. ..................... 396/87 |
| 5,634,148 A | | 5/1997 | Kunishige et al. ............. 396/86 |

FOREIGN PATENT DOCUMENTS

JP  5-181050  7/1993

* cited by examiner

Primary Examiner—Rodney Fuller
Assistant Examiner—Arthur A Smith
(74) Attorney, Agent, or Firm—Straub & Pokotylo; John C. Pokotylo

(57) ABSTRACT

A technique that allows the shared use of a zoom lens barrel in a camera having plural zoom specifications with low cost, the camera having an optical zoom system with a variable focal length from the wide-angle end to telephoto end by moving the zoom lens barrel from the wide-angle end to telephoto end. The camera has a zoom lens barrel for changing the focal length of a photographic optical system, a zooming part for driving the zoom lens barrel, a pulse generator part for generating pulse signals according to the movement of the zoom lens barrel, a counter part for increasing or decreasing the pulse number of the pulse signals according to the moving direction of the zoom lens barrel, a position detection part for detecting that the zoom lens barrel is at plural certain positions, and a control part for controlling the zooming part to prevent the zoom lens barrel from moving beyond the zoom limit. The control part determines that the zoom lens barrel is at one of the plural certain positions that is the closest to the zoom limit within the zoom range. After this detection, the control part controls the zoom lens barrel to stop when a certain number of pluses are counted that corresponds the movement from the closest certain position to the zoom limit. A memory may store the pulse number for the closest certain position and the certain number of pulses or information from which these are induced is provided. The control part performs controls based on the stored information.

19 Claims, 14 Drawing Sheets

CAMERA HAVING AN OPTICAL ZOOM SYSTEM

CROSS-REFERENCE TO RELATED APPLICATION

This application is based upon and claims the benefit of priority from the prior Japanese Patent Application No. 2001-006815, filed Jan. 15, 2001, the entire contents of the application are incorporated herein by reference.

BACKGROUND OF THE INVENTION

1. Field of the Invention

The present invention relates to a camera having a photographic optical zoom system, and especially to the driving mechanism of the optical photographic zoom system.

2. Description of the Related Art

Some cameras include an optical zoom system (zoom lens), i.e. a photographic optical system (photographic lens) that has a zooming function with which the focal length can be changed within a certain range. Many single lens reflex cameras are adapted to receive removable, and hence exchangeable, photographic lenses, while most compact cameras carry a photographic lens that has been mounted during production and is not removable or exchangeable. Therefore, many compact camera users select a camera having a zoom lens with a magnification range that meets their purpose and preference on purchase.

In most cases, the zoom lens has its focal length changed when the user pushes down a button to shift the lens barrel that holds the lens. When not in use, many zoom lenses are positioned at the barrel retracted position in which the lens barrel is retracted in the camera body.

When the camera is turned on, the lens barrel of the zoom lens comes out of the barrel retracted position. The zoom lens barrel stops within a zoom range that is defined by the zoom lens specification as a range of focal length in which photographs can be taken. At this point, the camera is ready to take pictures.

In many cases, the zoom lens barrel is initially set in the wide-angle position when the power is turned on. When the camera is ready for taking photographs, the lens barrel can be moved to change the focal length of the zoom lens by the operator pushing down a button. The lens barrel may move within the zoom range after the camera has been ready to take pictures, and is controlled not to move beyond the boundaries of the zoom range or the zoom limits. The zoom limit to the telephoto end is called the 'telephoto limit' or the 'tele position.' The zoom limit to the wide-angle end is called the 'wide-angle limit' or the 'wide position.' When the camera is turned off, the zoom lens barrel is automatically controlled to take the barrel retracted position.

For driving the zoom lens, the zoom lens barrel must be controlled to stop precisely at the zoom limit positions and not to move beyond them. However, it is undesirable to stop the zoom lens barrel by abutting it against a stopper, because this applies a load to the motor that is driving the zoom lens barrel. Therefore, position markers are provided at the zoom limit positions of the wide-angle and telephoto ends. And a controller of the camera stops the lens barrel when it detects the markers while driving the lens barrel.

The relative movement of the lens barrel is detected by counting pulse signals that are produced according to the movement of the lens barrel. Since the lens barrel moves back and forth within the zoom range, backlash of the motor and the driving mechanism of the lens barrel may cause count errors. The counted number may suggest a wrong position of the lens barrel. Therefore, the lens barrel position is directly detected to correct positional deviation. Compared with the relative lens barrel position detected by counting pulse signals, the position that is directly detected is called the 'absolute position.'

Proposed technologies relating to the position control of the lens barrel include, for instance, a technique described in Japanese Laid-Open Patent No. H05-181050 filed by the present applicant. This technique uses a pulse generator mechanism for generating pulses to detect the displacement of the focal length of the photographic optical system, a counter for counting pulses generated by the pulse generator mechanism, and a position detector mechanism for directly detecting the wide-angle and telephoto ends of the photographic optical system. Here, the output of the position detector mechanism is used to correct the counted pulse number, and thus, correct any discrepancy between the counted pulse number and the actual lens barrel position, enabling accurate position control. A camera with this technique detects the absolute position of a lens barrel that moves between the wide-angle and telephoto ends and controls the movement between them using a pulse count. In other words, absolute positions are determined within the moving range between the wide-angle and telephoto ends, and read patterns for correcting the pulse count are applied there. When the zoom lens barrel passes the absolute positions, the pulse number counted for detecting the position is corrected (increased or decreased), if necessary, to a correct pulse number to cancel any error that occurs by then and to obtain the correct position.

Manufacturers should provide a lineup of cameras having a variety of zoom specifications according to the users' preferences in order to meet their requirements and to induce them to purchase.

Manufacturers design and produce many different types of photographic lenses having different zoom specifications. If the different types of photographic lenses have a totally different structure and control mechanism, each requires certain design processes and financing for production equipment, influencing the production costs of the cameras.

It is preferred that as many common parts as possible be used to produce cameras with multiple zoom specifications, in order to reduce production costs.

It is an objective of the present invention to provide a camera having multiple zoom specifications at low cost by using the same zoom lens barrel.

BRIEF SUMMARY OF THE INVENTION

The present invention discloses a technique that allows a common zoom lens barrel to be used in cameras having different zoom specifications, thereby lowering production costs. The cameras have an optical zoom system with a variable focal length from the wide-angle end to telephoto end by moving the zoom lens barrel from the wide-angle end to telephoto end.

The camera has a zoom lens barrel for changing the focal length of a photographic optical system, a zooming part for driving the zoom lens barrel, a pulse generator part for generating pulse signals according to the movement of the zoom lens barrel, a counter part for increasing or decreasing the pulse number of the pulse signals according to the moving direction of the zoom lens barrel, a position detection part for detecting when the zoom lens barrel is at certain (predetermined) positions, and a control for controlling the zooming part to prevent the zoom lens barrel from moving beyond the zoom limit.

The control determines when the zoom lens barrel is at one of the certain (predetermined) positions that is the closest to the zoom limit within the zoom range. After this detection, the control controls the zoom lens barrel to stop when a certain number of pluses are counted that corresponds the movement from the closest certain position to the zoom limit.

It is preferred that a memory that stores the pulse number for the closest certain position and the certain number of pulses or information from which these are induced is provided and the control performs controls based on the stored information.

BRIEF DESCRIPTION OF THE SEVERAL VIEWS OF THE DRAWING

FIG. 5 is the first half of a flowchart for explaining the power-on reset subroutine of a camera according to the second embodiment of the present invention when the power is turned on.

FIG. 6 is the second half of a flowchart for explaining the power-on reset subroutine of a camera according to the second embodiment of the present invention when the power is turned on.

DETAILED DESCRIPTION OF THE INVENTION

Preferred embodiments of the present invention are described hereafter, with reference to the drawings.

Figure 1A:
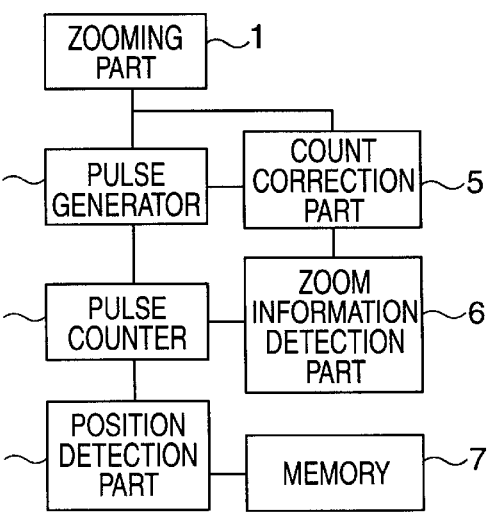
FIG. 1(a) is a block diagram showing the structure of a camera according to a first embodiment of the present invention.
Figure 1B:
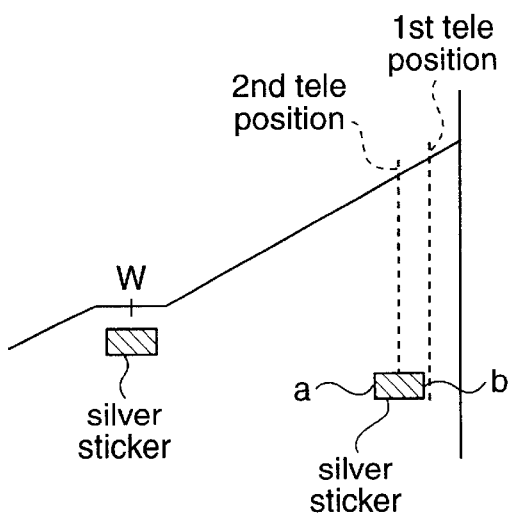
FIG. 1(b) shows the relationship between positions of a rotating ring and positions of a zoom lens barrel.

FIG. 1(a) is a block diagram showing the structure of an embodiment of the camera according to the first embodiment of the present invention. FIG. 1(b) is a schematic presentation for explaining the movement and stop positions of the zoom lens barrel of the present invention.

As shown in FIG. 1(a), the camera comprises a zooming part 1 for driving the zoom lens barrel to change the focal length of the photographic optical system, a pulse generator 2 for generating the number of pulses that corresponds to the movement of the zoom lens barrel, a pulse counter 3 for increasing or decreasing the pulse number depending on the moving direction of the zoom lens barrel, a position detector 4 for producing a certain position signals when the zoom lens barrel approaches the zoom limits of the wide-angle and telephoto ends, a count correction part 5 for correcting the count of the counter 3 to a certain number depending upon the output change of the position detector 4, a zoom information detection part 6 for obtaining a zoom position information based on the output of the counter 3 and the information stored in the memory 7, and a memory 7 for storing information used for detecting the zoom limits of the wide-angle and telephoto ends.

Figure 4:
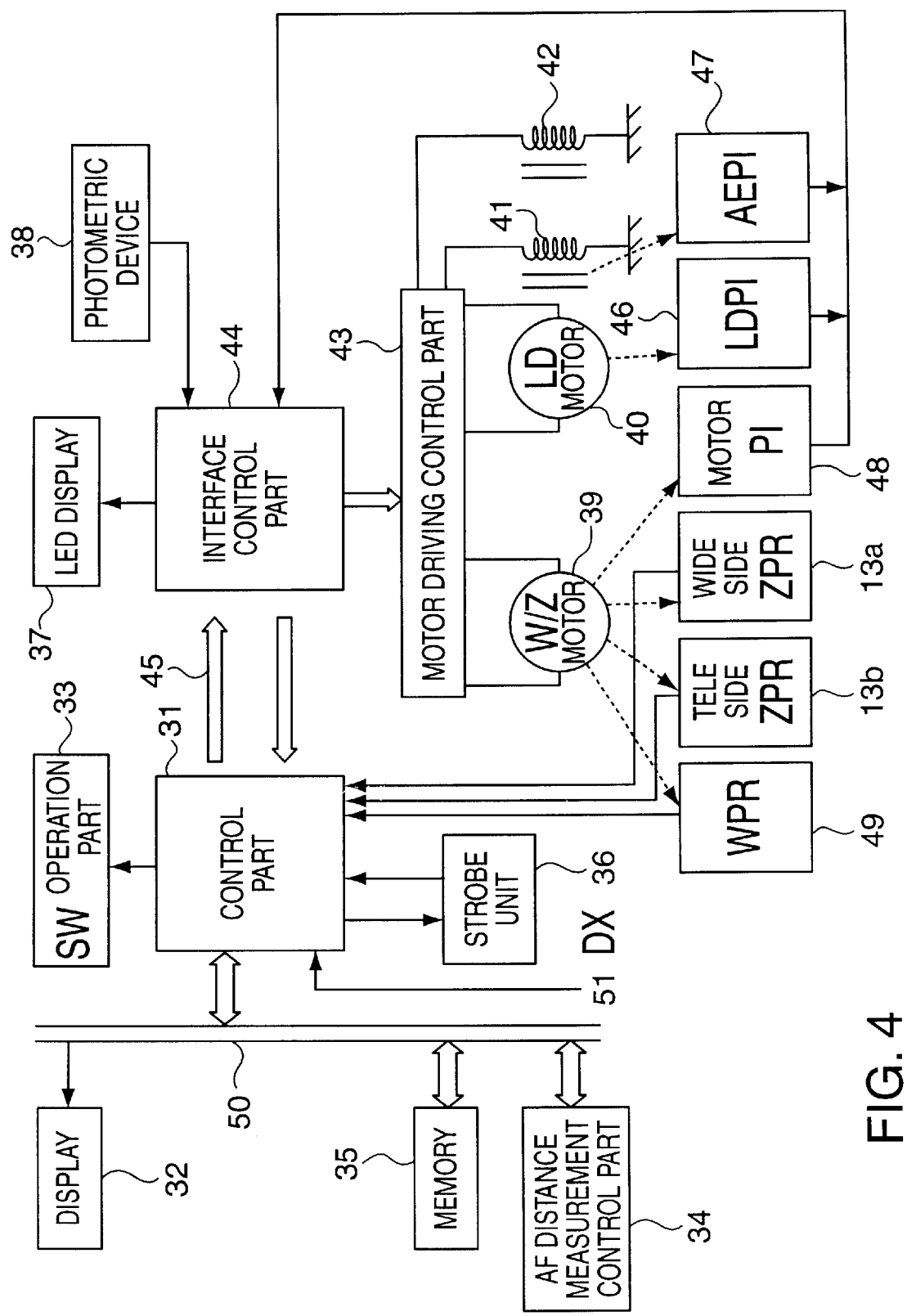
FIG. 4 is a block diagram showing the structure of an embodiment of a camera according to a second embodiment of the present invention.

In this camera, a rotating ring (FIG. 2) is rotated based on the operation of a switch operation part (33 in FIG. 4).

The zoom lens barrel moves in relation to the rotation of a rotating ring.

The position detecting part 4 of the camera may use an optical sensor including a light emitting device and receiving optics, and a highly reflective member such as silver sticker, where the position of the silver sticker changes according to the movement of the barrel. The movement of the zoom lens barrel is controlled by the control part (31 in FIG. 4) based on the operation at the switch operation part (33 in FIG. 4). However, the position detecting part 4 is not necessarily an optical one, and can be mechanical or magnetic one.

FIG. 1(b) shows the relationship between the rotation of the rotating ring and the movement of the zoom lens barrel. The abscissa shows the rotational positions of the rotating ring and the ordinate shows the movements of the zoom lens barrel. The zoom lens barrel moves almost in proportion to the rotation of the rotating ring. However, the zoom lens barrel does not move around the position indicated by W, even though the rotating ring rotates.

The zoom specification of the camera allows for two zoom limits (first and second tele positions) at the telephoto end. The zoom limit at the wide-angle end is indicated by a W. When the first tele position is selected as the telephoto side zoom limit, the zoom range is between W and the first tele position. Then, the zoom lens has the smallest focal length at the position W and the largest at the first tele position. For photography, the control controls the zoom lens barrel to move between the W and the first tele position.

On the other hand, when the second tele position is selected as the telephoto side zoom limit, the zoom range is between W and the second tele position. A desirable tele position is selected according to the zoom specification of a camera in which the zoom lens barrel is mounted.

The zoom lens barrel is in its retracted position when it is located on the left side of W. An extra margin is also reserved on the right side of the first tele position. The right end of this extra margin is the mechanical telephoto end, which is the limit to which the zoom lens barrel is allowed to mechanically move and at which the zoom lens barrel would abut a stopper.

A highly reflective member is applied around the wide-angle side zoom limit W. Another highly reflective member is applied to the telephoto end that overlaps the second tele position, but not the first tele position. As an example of the highly reflective members, silver stickers are described hereafter. For a zoom-in operation, when the zoom lens barrel enters the telephoto side silver sticker, the position detection part changes its output to H (high) from L (low). In this instance, the output signal has a leading edge. For a zoom-in operation, when the zoom lens barrel leaves the telephoto side silver sticker, the position detection part changes its output to L (low) from H (high). In this instance, the output signal has a trailing edge.

The wide-angle side end 'a' of the telephoto side silver sticker is used as a reference to stop the zoom lens barrel at the second tele position. The control detects that the zoom lens barrel has reached the wide-angle side end 'a' of the silver sticker using the leading edge of the output of the position detector during the zoom-in operation. Then, when a certain number of pulses are counted after the detection, the control decides that the zoom lens barrel has reached the second tele position and stops it.

The telephoto side end 'b' of the telephoto side silver sticker is used as reference to stop the zoom lens barrel at the first tele position. The control detects that the zoom lens barrel has reached the telephoto side end 'b' of the silver sticker using the trailing edge of the output of the position detection part during the zoom-in operation. When a certain number of pulses are counted after the detection, the control decides that the zoom lens barrel has reached the first tele position and stops it.

Which reference position is used, end a or b, is determined by the contents of the memory 7. The memory 7 stores information defining the telephoto end position, which corresponds to the leading or trailing edge of the output of the position detector 4. The memory 7 also stores the pulse number between the reference position and the telephoto side zoom limit. Therefore, the telephoto side zoom limit can be easily changed between the first and second tele positions. Instead of storing the chosen edge and the pulse number, the memory 7 can store any information from which the reference position and pulse number above can be derived.

By electrically changing the setting, the control can stop the zoom lens barrel at either one of the first and second tele positions as the telephoto side zoom limit. In other words, plural positions are available for the telephoto side zoom limit. Therefore, lens assembles having different zoom specifications can be mounted in the same lens barrel and can be stopped at any position by electrically switching the settings on the program. In other words, different types of optical zoom systems having different telephoto side zoom limits can use the same lens barrel.

Lens assembles having the same lens configuration can be given different effective zoom specifications by electrically setting different zoom limits. For example, a zoom lens assembly having photographically useable focus range from 28 mm to 135 mm can have it's zoom range narrowed by setting zoom limits, for example, from 35 mm to 75 mm. Therefore, a camera maker may provide many types of zoom cameras having different zoom ranges but having the same zoom lens or lens barrels by setting different zoom limits.

One specific program can be commonly used by different kinds of cameras which carry the same barrel or lens, but that does not prevent each camera from having its own program. The common program may use the information stored in the memory 7 to determine which reference is used, the end a or b of the highly reflective member. A program adapted to a specific camera does not always need to use the information stored in the memory 7, because such a specific program can have necessary parameters in its sequence.

The telephoto side zoom limit locates on the telephoto side of the reference position a or b (the end of the silver sticker). This configuration has an advantage that when zooming from wide end to telephoto end, the reference position is detected and the lens barrel position can be corrected, then the telephoto side zoom limit is accurately detected using the corrected pulse count. If the telephoto side zoom limit is not on the telephoto side of the reference position, the lens barrel passes the telephoto side zoom limit to reach the reference position before it comes back to the telephoto side zoom limit.

As the reference position for the each telephoto side zoom limits (the first and second tele position), the closest reference position to the each telephoto zoom limit within the zoom range is chosen. Thus, the right end b of the silver sticker is the reference position when the first tele position is selected as the telephoto side zoom limit while the left end a of the silver sticker is the reference position when the second tele position is selected as the telephoto side zoom limit. In this way, the telephoto side zoom limit, and the reference position are sufficiently close to each other, reducing the chance of counter error.

When an optical position detector is used, good durability is obtainable. Both ends of the area (for instance a silver sticker) that has a higher reflectance than the background are used as markers. These position markers are accurate and easy to provide. Detecting the markers is easy because the detection of the leading or trailing edge of a signal is easy for processing. Using both ends of a sticker as markers ensures an accurate distance between the two reference positions.

Figure 1C:
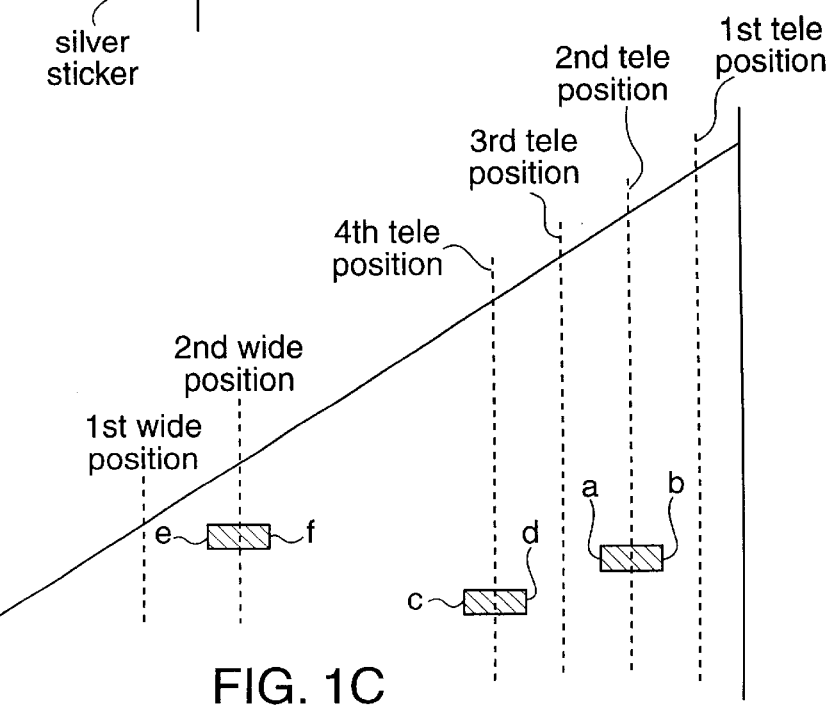
FIG. 1(c) shows the relationship between positions of the rotating ring and position of the zoom lens barrel in the case in which many stop positions are available.

The present invention can apply a lens barrel having more than two selectable zoom limits. The present invention can apply not only to the telephoto side zoom limit, but also to the wide-angle side zoom limit. An embodiment of which is shown in FIG. 1(c). FIG. 1(c) shows an embodiment in which the telephoto side zoom limit can be set for four different positions (first, second, third, and fourth tele positions). The first tele position is detected based on the position b of a silver sticker; the second tele position based on the position a of the silver sticker; the third tele position based on the position d of another silver sticker; and the fourth tele position based on the position c of the other silver sticker. The wide-angle side zoom limit can be set for two different positions (first and second wide positions). The first wide position is detected based on the position e of a third silver sticker and the second wide position based on the position f of the third silver sticker. Each tele position is detected as described with reference to FIG. 1(b). Therefore, the explanation is omitted here. The telephoto side zoom limit position is described hereafter using an embodiment having two possible settings for facilitating the explanation.

Cameras employing the present invention may be film cameras, digital cameras, or video cameras. The usage of the cameras may be personal one, broadcasting, monitoring, commercial, or medical fields, but is not restricted thereto.

Figure 2:
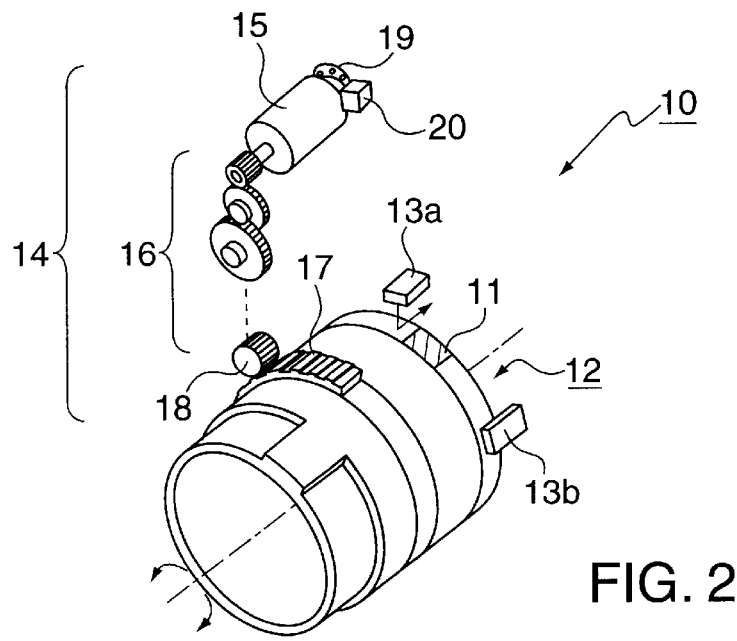
FIG. 2 is a schematic presentation showing the structure of a zoom encoder and driving mechanism thereof for a camera according to the present invention.

FIG. 2 is a schematic presentation showing a zoom encoder 10 and the driving mechanism of an embodiment of a lens barrel, for use in a camera, according to the present invention.

A silver sticker 11, exemplifying a highly reflective member, is provided on a rotating ring 12 in a zoom lens barrel of the camera. The rotating ring 12 rotates in the two directions indicated by arrows in the figure to drive the zoom lens barrel (not shown) in the optical axis direction. Two zoom photo-emitter/detectors are disposed at certain positions of the wide-angle and telephoto ends of the camera body (ZPR: ZPR 13a on the wide side, ZPR 13b on the tele side) in order to detect the silver sticker 11 when it is positioned across from either emitter/detector.

A zooming unit 14 is a driving mechanism for rotating the rotating ring 12. The zooming unit 14 comprises a motor 15, a reduction gear train 16 for transmitting the driving force of the motor 15, an output gear 18 that is engaged with the last gear of the reduction gear train 16 and a driving gear 17 provided on the outer periphery of the rotating ring 12 for transmitting the driving force of the motor 15 to the rotating ring 12. In the zooming unit 14, the motor 15 rotates forward or backward depending on the instruction of a zoom switch (SW) and its driving force is transmitted to the driving gear 17 on the rotating ring 12 via reduction gear train 16 and the output gear 18 to rotate the rotating ring 12.

The zooming unit 14 further comprises a slit 19 provided on the extended axis line of the motor 15 and rotated together with the motor 15, and a photo-interrupter (PI) 20 that produces output signals in association with the rotation of the slit 19. The rotation of the slit 19 in association with the rotation of the motor 15 causes the receiving optics to intermittently receive light from a light emitting device in the photo-interrupter 20. This allows the photo-interrupter 20 to produce the number of pulses that correspond to the rotations of the motor 15. Since the rotating ring 12 is driven by the rotation of the motor 15, the pulse number also corresponds to the driving amount of the rotating ring 12. Instead of associating with the motor 15, the slit 19 and the PI 20 can be provided at the reduction gear train 16 or can be associated with the rotating ring 12. Other means of encoding a driving amount of the rotating ring 12 may be used instead.

The motor 15 is a driving source of the zooming unit 14, as described above. It can be also used as a driving source for the film feeding by switching a switching mechanism (not shown).

The zoom encoder 10 that determines the position of the rotating ring 12 includes the silver sticker 11, ZPR 13a, ZPR 13b, slit 19, and PI 20. The ZPR 13a and ZPR 13b illuminate the rotating ring 12 with light from a light emitting device and receive the light that is reflected on the surface of the rotating ring 12, producing signals corresponding to the received amount of light. The rotating ring 12 has low reflectance (may be black) except for the area on which the silver sticker 11 is applied. Therefore, when the silver sticker 11 reaches the part that is illuminated by light from the light emitting device while the rotating ring 12 rotates, the ZPR 13a (or ZPR 13b) changes its output. This output change indicates that the rotating ring 12 is located at a certain (absolute) position.

Figure 3:
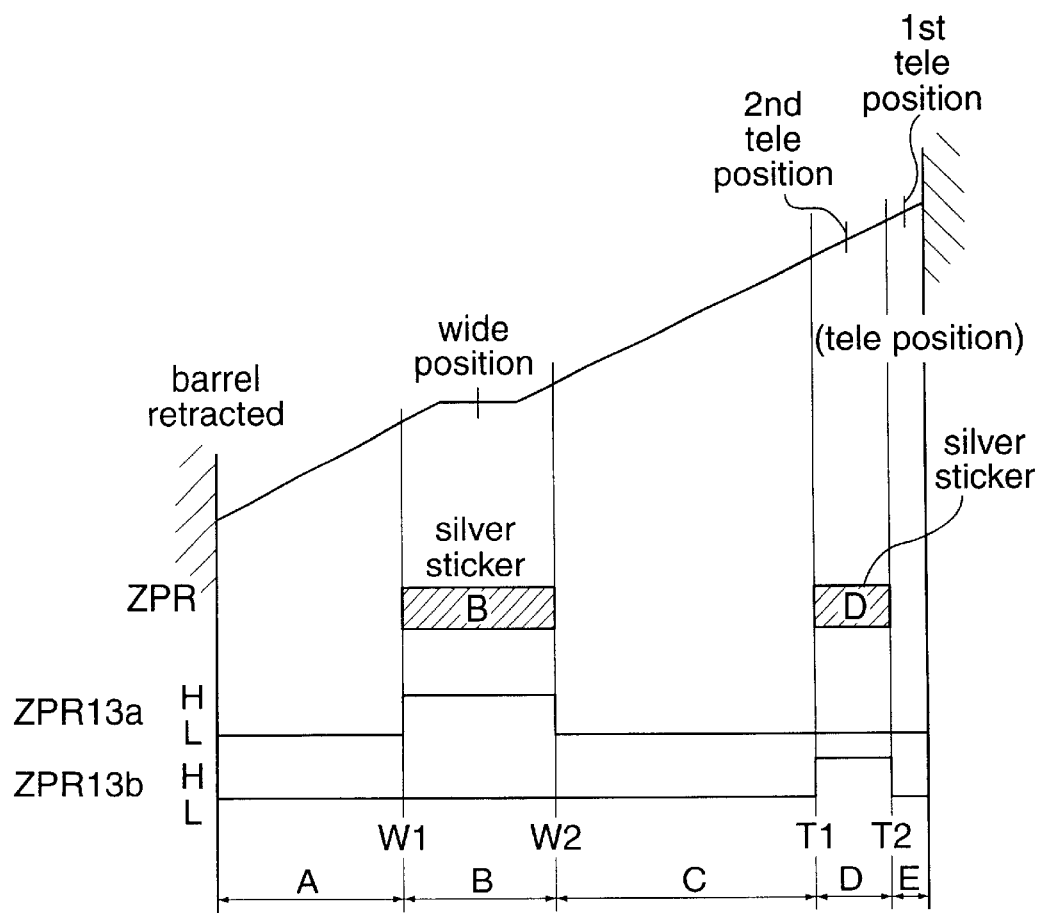
FIG. 3 shows the relationship between the output of ZPR and PI in relation to the rotation of the zoom encoder.

The silver stickers 11 can be preferably provided for detecting the tele and wide positions separately, as shown in FIG. 1(b) and FIG. 3, other than one sticker provided as shown in FIG. 2 because a plurality of stickers permits more design options. However, providing only one silver sticker 11 may be sufficient for certain applications since the stop position can be adjusted using the position of the silver sticker 11 or the positions of ZPR 13a or ZPR 13b.

When only one silver sticker 11 is used, two photo-emitter/detectors are necessary, one each for the tele and wide ends. In this case, if the rotating ring 12 is on the telephoto side, the end of the silver sticker 11 is detected by the photo-emitter/detector ZPR 13b on the tele side. If the rotating ring 12 is on the wide-angle side, the end of the silver sticker 11 is detected by the photo-emitter/detector ZPR 13a that is on the wide side. When two silver stickers 11 are used, the silver stickers 11 are applied to the tele and wide ends, respectively. This allows the shared use of a one common photo-emitter/detector between the tele and wide ends. In other words, different basic structures are possible: (a) two photo-emitter/detectors and one silver sticker, or (b) one photo-emitter/detector and two silver stickers. However, a structure using two photo-emitter/detectors and two silver stickers is the easier to adjust.

The zooming unit 14 in FIG. 2 exemplifies a zooming part 1 in FIG. 1; the photo-interrupter 20 exemplifies the pulse generator 2; and the photo-emitter/detector ZPR 13a and ZPR 13b exemplify the position detector 4.

FIG. 3 shows the relationship between the rotation magnitude of the rotating ring 12 and the output of the ZPR 13a and ZPR 13b as well as the relationship between the rotation magnitude of the rotating ring 12 and the projection magnitude of the zoom lens barrel. The abscissa shows the rotational positions of the rotating ring 12 and the ordinate shows output intensity for the output of the ZPR 13a and ZPR 13b and the projection magnitude for the zoom lens barrel. The lowest line shows the output of the ZPR 13b, the second lowest line from the bottom shows the output of the ZPR 13a, and the highest, an inclined line shows the projection magnitude of the zoom lens barrel.

The position of the rotating ring 12 is classified generally in the areas A, B, C, D, and E. The rotating ring 12 has highly reflective (e.g., silver or white) stickers at the positions corresponding to the areas B and D and has a low reflective (e.g., black color) surface at the positions corresponding to the areas A, C, and E (in fact, the rotating ring 12 is preferably made of black material). The area A is the barrel retracted position and the rotating ring 12 is at the left end of the area A when the camera is not in use. At this point, the zoom lens barrel is retracted in the camera body, that is to say, in the barrel retracted position. The area B is the wide region, the region in proximity to the wide-angle side zoom limit (zoom limit at the wide-angle end). The area C is the middle region, throughout which photography is available. The area D is the tele region, the region in proximity to the telephoto side zoom limit (zoom limit at the telephoto end). The area E is the tele end region, which is further to the right of the area D. Among these areas, the photographic range (zoom range) designed is either between the wide position in the area B and the second tele position in the area D, or between the wide position in the area B and the first tele position in the area E. Which photographic region is used is determined by the contents stored in the memory 7 in FIG. 1.

First, the output of the ZPR 13a is described. Assuming that the rotating ring 12 rotates from the area A to the area B, the left end of the silver sticker 11 is first detected and, therefore, the ZPR 13a outputs the leading signal (L→H). Then, the rotating ring 12 rotates further from the area B to the area C, the right end of the silver sticker 11 is detected and, therefore, the trailing signal (H→L) is detected.

Next, the output of the ZPR 13b is described. Assuming that the rotating ring 12 rotates from the area C to the area D, the left end of the silver sticker 11 is first detected and, therefore, the ZPR 13b outputs the leading signal (L→H). Then, the rotating ring 12 rotates from the area D to the area E, the right end of the silver sticker 11 is detected and, therefore, the trailing signal (H→L) is detected.

In this way, the outputs of the ZPRs 13a and 13b enable predetermined absolute positions of the rotating ring 12 located at the ends of the silver sticker 11 to be determined.

As for projection magnitude of the zoom lens barrel, the projection of the zoom lens barrel is proportional to the rotation of the rotating ring 12. However, the zoom lens barrel does not move when the rotating ring 12 rotates along some part (see the flat part of the projection line) of the area B. This is the initial position of the zoom lens barrel when the camera is turned on. This is for the zoom lens barrel to stop at the correct projection position even if the position of the rotating ring 12 is more or less inaccurately controlled at the initial position.

FIG. 4 is a block diagram of the embodiment of a camera according to the second embodiment of the present invention. The camera comprises a control part (CPU) 31, such as a microcomputer for controlling the entire operation of the zoom camera, a display 32 for displaying information regarding photography, a switch operation part 33 including a release switch for directing the exposure operation, an AF distance measure control part 34 for controlling a device for distance measurement and calculating the distance, a memory 35 for storing control information relating to the camera, a strobe unit 36 that emits supplementary light, an LED display 37 for informing the photographer of strobe illumination alarm and AF lock, and a photometric device (SPD) 38 for photoelectric conversion for measuring luminosity. The camera further comprises a motor driving control part 43 for driving a winding up/zoom (W/Z) motor 39 and a lens driving (LD) motor 40. The W/Z motor 39, which corresponds to the motor 15 in FIG. 2, provides a power source for winding the film and moving the zoom lens barrel. The lens driving (LD) motor 40 provides a power source for driving lenses for focusing. The cameras also includes a shutter plunger 41, and a switching plunger 42 for switching the driving force of the W/Z motor 39 between the film winding-up and zooming operation, and an interface control part 44 for communicating with the control part 31.

More specifically, the control part 31 controls the entire camera including the main sequence of the camera, the calculation of lens driving amount for auto-focus (AF), the automated exposure (AE) calculation, the AD conversion in calculation, the display 32 and LED display 37, and switch controls, such as the switch operation part 33. The display part 37 may be a liquid crystal display panel, for instance LCD panel, and may be used to display the number of exposed frames of a film, photographing mode setting, time, battery check result, and others.

The switch operation part 33 may comprise a two-step release switch having a first release for locking the distance and luminosity when the release button is pushed down and a second release for exposure when the release button is further pushed down, a zoom-in switch (ZUP), a zoom-out switch (ZDN), a flash SW for changing the illumination of the camera strobe, a self SW for enabling the remote control and self-timer function, a mode SW for selecting the display mode of the present date, a date setting SW for setting the present date, a power SW for turning on and off the camera, a rewind switch RWSW for rewinding the film in use for photography, and a back cover switch BKSW for detecting the closed back cover and directing the film feeding.

The AF distance measure control part 34 finds the distance to the object based on control signals from the control part 31 and returns it to the control part 31 via a serial data bus 50. The memory 35 may be a memory media that can (e.g., electrically) write and delete data, for instance an EEPROM. The memory 35 may be used to store various adjustment values such as the exposure number of a film, the wide side and tele side focal lengths and positions of the lens barrel used, position pulse when the ZPR 13a or ZPR 13b changes, information on whether the tele position corresponding to the camera specification is on the silver sticker 11 at the tele end (the second tele position in the area D) or on the telephoto side of the silver sticker 11 at the tele end, strobe charged voltage information, and battery check information.

The strobe unit 36 starts charging when it is given a charge signal from the control part 31. The charged voltage is monitored by the control 31 and compared with the charged voltage information previously stored in the memory 35 to determine whether charging is completed or not. The interface control part 44 may include an LED drive circuit, a photometer circuit for measuring luminosity based on the output of the photometry device 38, a motor drive circuit, a reference voltage circuit, and others.

A direction signal from the control part 31 is used to select and activate one of the actuators for the W/Z motor 39, an LD motor 40, a shutter plunger 41 for opening/closing the shutter, and a switching plunger 42 for switching between the winding-up operation and zooming operation of the W/Z motor 39. A photo-interrupter (LDPI) 46 is provided near the LD motor 40 for producing output signals in association with its rotation. The output signals from the photo-interrupter are input into the control part 31 via the interface control part 44 and the LD motor 40 is controlled based on them.

The shutter photo-interrupter (AEPI) 47 outputs signals synchronous with the shutter opening/closing through electrical conductivity to the shutter plunger 41. When the driving force of the W/Z motor 39 is applied to the film winding operation part, the W/Z motor is controlled based on the output of the motor PI (MTPI) 48 that corresponds to the photo-interrupter 20 in FIG. 2 and the output of a photo-reflector (WPR) 49 that outputs signals depending on the movement of the film. When the driving force of the W/Z motor 39 is applied to the zooming operation, the W/Z motor 39 is controlled by the control 31 based on the output signals of the motor PI 48, wide side ZPR 13a, and tele side ZPR 13b. The W/Z motor 39 rotates forward for zooming-in and backwards for zooming-out. A DX code 51 provided on a film cartridge is directly read into the control 31 when the cartridge is mounted and used as a factor to determine exposure.

As described above, the zoom lens barrel moves according to the rotation of the rotating ring 12. Therefore, the position of the zoom lens barrel is indicated by the position of the rotating ring 12 in the following explanation of the flowchart.

Figure 5:
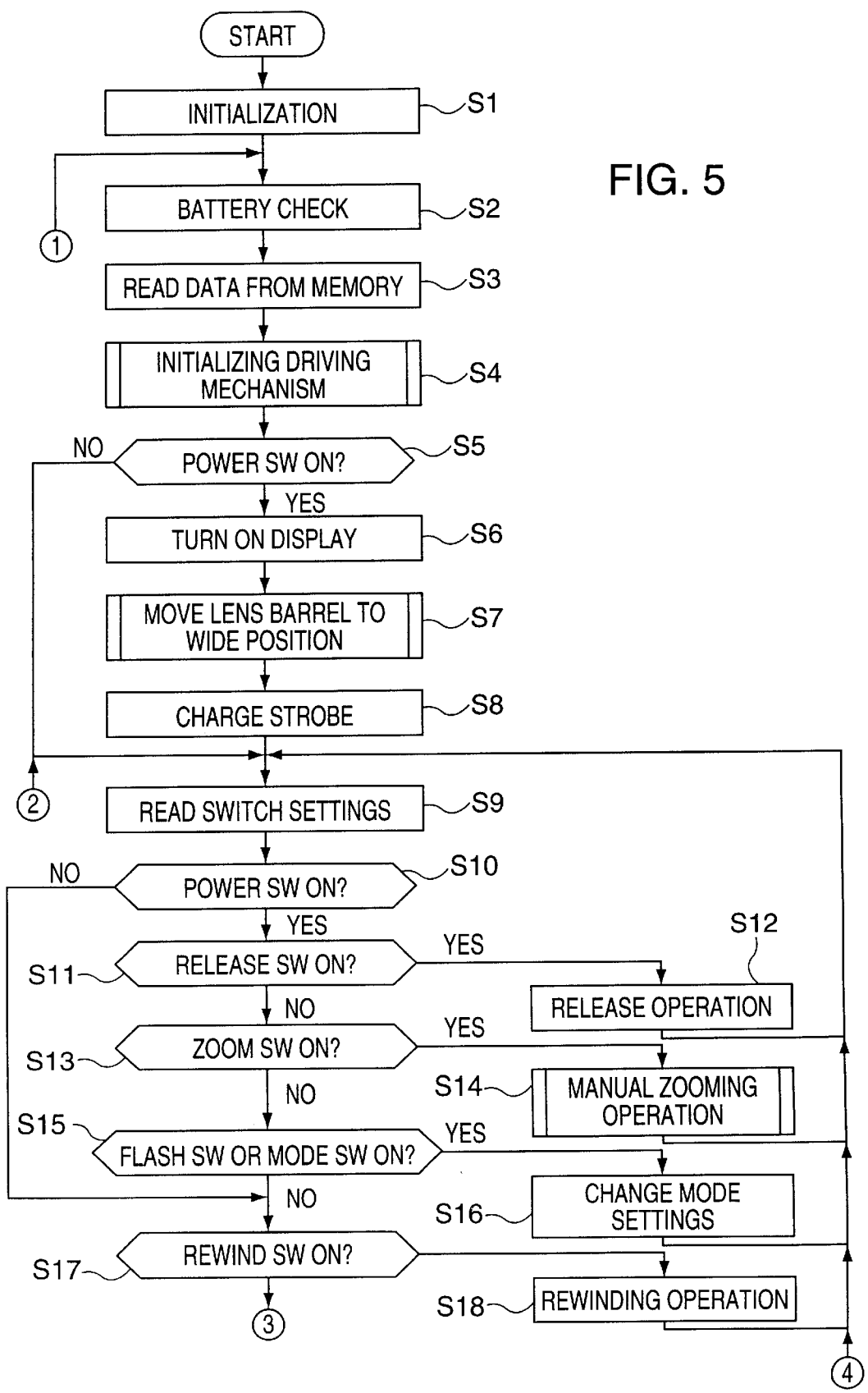
Figure 6:
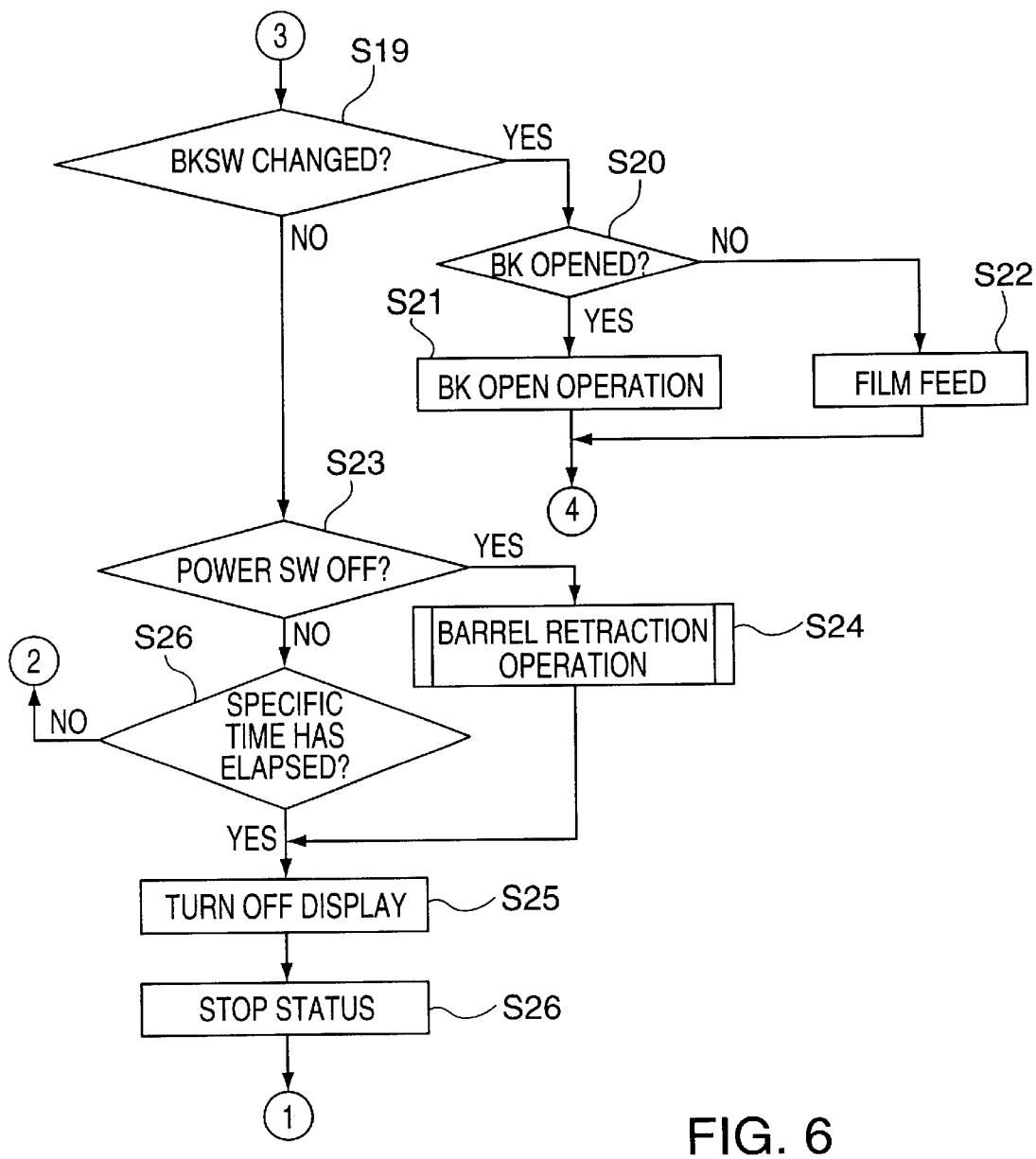

The entire operation of the embodiment of a camera according to the present invention is outlined hereafter, with reference to the flowcharts shown in FIGS. 5 and 6.

First, when a battery is mounted in the camera body, the control part 31 is reset for initialization (Step S1). The initialization includes initialization of ports and RAM in the control part 31. Then, the control 31 checks the battery condition mounted in the camera using the battery check circuit (Step S2). Here, if the remaining battery capacity is insufficient compared to the driving voltage, lack of the remaining battery capacity is displayed on the display 32 and operation of the camera is prevented.

Then, the control part 31 reads data previously stored in the memory 35 and stores them in the RAM built in the control part 31 (Step S3). In order to initialize the camera driving mechanism, the W/Z motor 39 is switched to apply its driving force to the zooming unit 14 or the zooming operation part to move the lens barrel to the barrel retracted position (Step S4). Then, the power SW is checked if it is on (Step S5). If it is on (YES), the display 32 displays the number of exposed frames and photographing mode setting (Step S6). The zoom lens barrel is moved from the barrel retracted position to the wide position for photography (Step S7) and the strobe is charged (Step S8). Then, the camera switch settings are read and the camera is operated to comply with the read settings (Step S9).

If the power SW is not on (NO) in Step 5 above, the program goes to Step S9.

Then, the control part 31 checks to see whether the power SW is on or not (Step S10). If it is off (NO), the camera is assumed to be under a key lock condition, and the program goes to Step S17. If it is on (YES), a determination is made as to whether the release button is pushed down (Step S11). If the first and second release SWs are on (YES), the release operation is performed (Step S12), and the program returns to Step S9.

Referring back to Step 11, if the release button is off (NO) then, the control part 31 determines whether the zoom-in SW or zoom-out SW is pushed down (Step S13). If the zoom-in or zoom-out SW is pushed down (YES), the zooming operation according to the pushed SW is performed (Step S14), and the program returns to Step S9. Referring back to Step S13, if the zoom-in or zoom-out SW is not pushed down (NO), then a determination is made as to whether the flash SW or mode SW is pushed down (Step S15). If either one is pushed down (YES), the camera mode is altered according to the pushed SW (Step S16), and the program returns to Step S9. Referring back to Step S15, if neither the flash SW, nor the mode SW is on (NO), then it is further determined whether the rewind SW is pushed down (Step S17). If the rewind SW is on (YES), the film rewind operation is performed (Step S18), and the program returns to Step S9.

Referring back to Step S17, if the rewind SW is not on (NO), then the control part 31 also determines whether the back cover switch (BKSW) is changed (Step S19). If the BKSW is changed (YES), a determination is made as to whether the back cover is opened/closed (Step S20). If the back cover is found to be opened (YES), a certain operation for the opened back cover is performed (Step S21), and the program returns to Step S9. Conversely, if the back cover is found to be closed (NO), the film feeding operation is performed (Step S22), and the program returns to Step S9.

Referring back to Step S19, if the BKSW is not changed (NO), then, the control part 31 determines whether the power SW is turned off (Step S23). If the power is off (YES), the lens barrel retraction operation is performed (Step S24) and the display on the display part 32 is turned off (Step S25). However, if the power is not off (NO), the elapsed time is measured since the various switches are operated and a determination is made as to whether a certain time period has elapsed (Step S26). If the camera has not been operated for more than the certain time period (YES), the program goes to Step S25. However, if any switch is operated before the certain time period elapses (NO), the program returns to Step S5 and the operations described above are repeated. Referring again to Step S25, the display on the display 35 is turned off, which is followed by the stop condition (Step S26) although the power SW, BKSW, and rewind SW are allowed to interrupt. Here, if any change is found in the power SW, BKSW, or rewind SW, the stop condition is canceled and the camera operation starts from Step S2.

Figure 7:
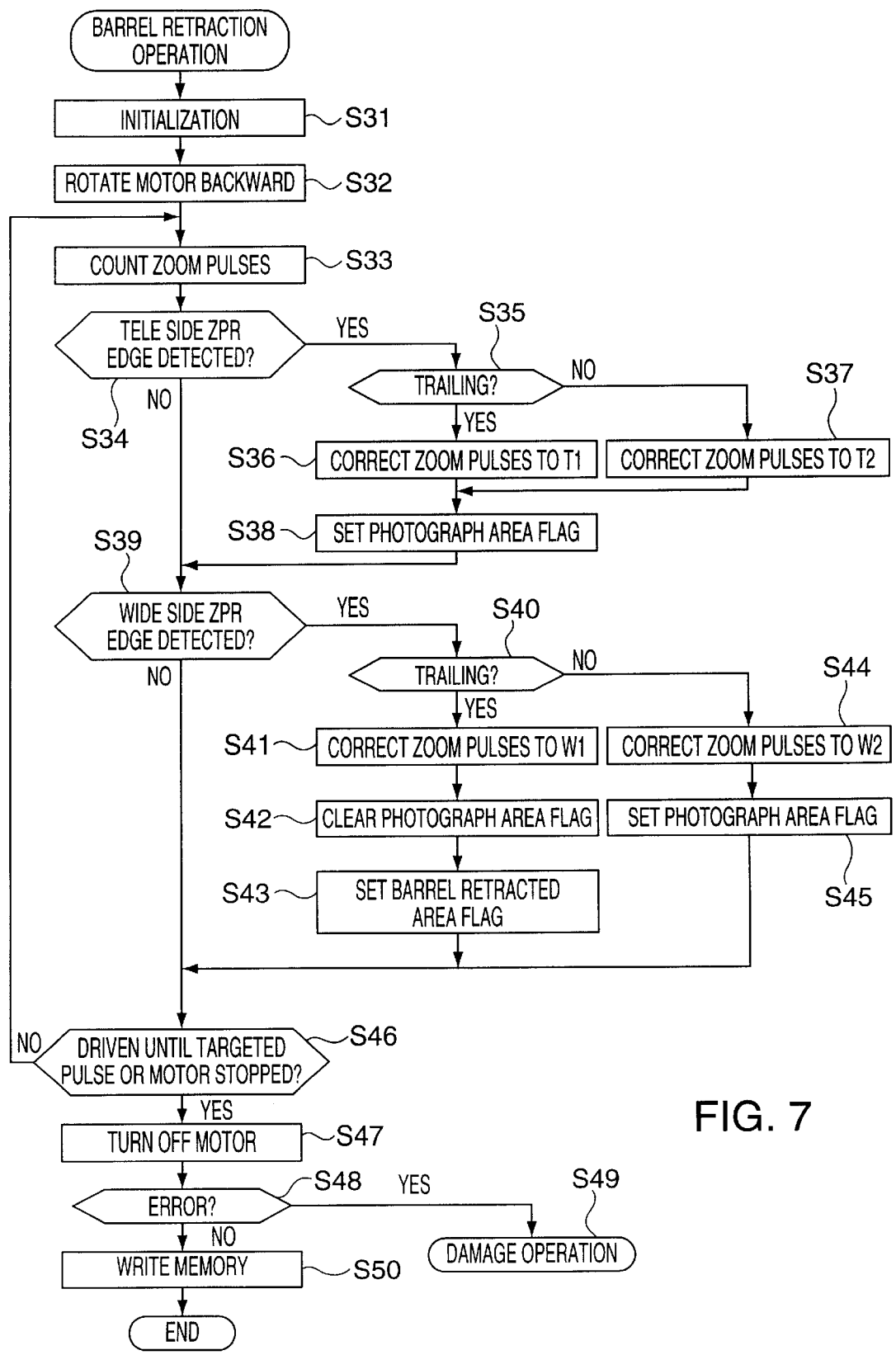
FIG. 7 is a flowchart for explaining the initialization and barrel retract operation of the driving mechanism.
Figure 8:
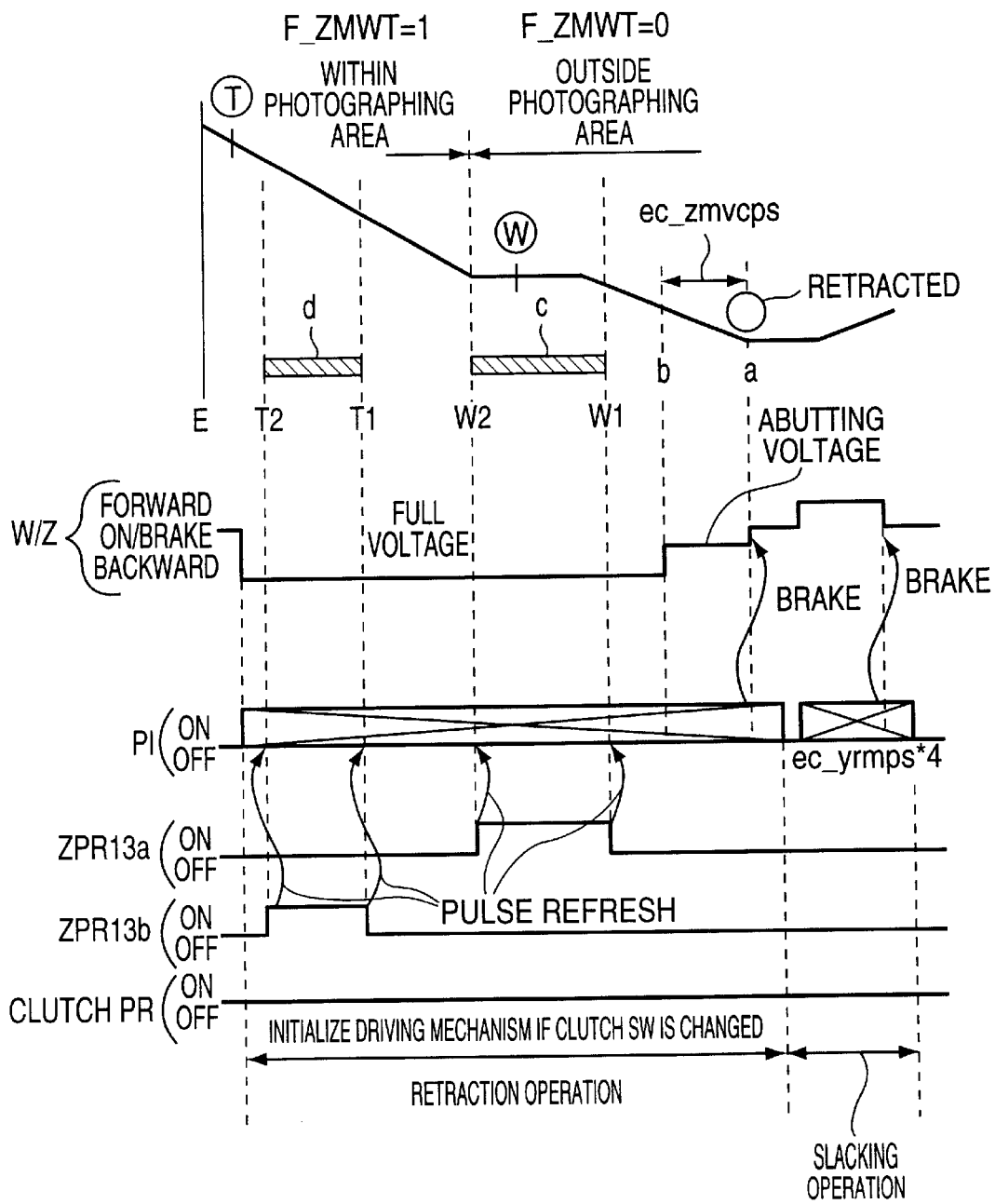
FIG. 8 is a timing chart for explaining the initialization and barrel retract operation of the driving mechanism.

The barrel retract operation, is described hereafter, with reference to the flowchart shown in FIG. 7. The barrel retract operation is performed during driving mechanism initialization at Step S4 in FIG. 5 as well as at Step S24 in FIG. 6. Timing of the voltage in the barrel retraction operation is shown in the timing chart in FIG. 8. When the control part 31 detects that a battery is mounted in the camera body or the power switch is turned on, the barrel retraction operation starts.

First, initialization is performed (Step S31). During initialization, the control part 31 switches the W/Z motor 39 to apply its driving force to the zooming operation. When a battery is mounted, the current position of the lens barrel is unknown. Therefore, wherever the zoom lens barrel is, the W/Z motor 39 is driven to move the zoom lens barrel to the barrel retracted position. In other words, the current position is set for the pulse number corresponding to the tele position, a current position unknown flag is set for 1, the ZPRs 13a and 13b and motor PI 48 are set for ready to read, and a drive target pulse is set for the barrel retracted position.

Then, the control part 31 rotates the W/Z motor 39 backward to start the zoom-out operation (Step S32).

The lens barrel, the position of which is unknown when a battery is mounted, may be possibly somewhere in the area A shown in FIG. 3. In this case, using a full voltage to move and abutting it against the barrel retraction end may damage the drive mechanism. Therefore, certain low voltage is used to drive the motor. In other cases, the motor can be driven at a full voltage.

Then, the control part 31 detects the condition of the motor PI 48 and starts counting down the pulses for the barrel retracted position (Step S33). A determination is made as to whether there is any change in signals from the tele side ZPR 13b, the change means the tele side ZPR 13b detects an end of the side silver sticker (Step S34). If there is no change in signals from the tele side ZPR 13b (NO), the program goes to the Step S39. If there is any change in signals from the ZPR 13b (YES), a determination is made as to whether the detected signal change is based on a trailing edge (Step S35). If it is a trailing edge (YES), the counted zoom pulse number is corrected to the pulse number for the position T1 in FIG. 3 that is previously stored in the memory 35 (Step S36). Conversely, if not a trailing edge (NO), the zoom pulse number is corrected to the pulse number for the position T2 in FIG. 3 that is previously stored in the memory 35 (Step S37).

Because the control 31 has detected an edge change of the tele side ZPR 13b, it is confirmed that the zoom barrel is in the photography area; therefore, the photography flag is set (e.g., to 1) (Step S38). The current position is now known from the previous procedure and, therefore, the current position unknown flag is cleared if it is 1. The motor driving voltage is switched to high. Then, a determination is made as to whether there is any change in signals from the wide side ZPR 13a (Step S39). If there is no change in signals from the wide side ZPR 13a (NO), the program goes to the Step S46, described later.

If the wide side ZPR 13a detects an edge (YES), the control 31 determines whether a trailing edge of a signal is detected (Step S40). If a trailing edge of a signal is detected at Step S40 (YES), the correction is performed in which the pulse number is corrected to the pulse number for the position W1 in FIG. 3 (Step S41). Since the lens barrel is moved to the barrel retracted area, the photography area flag is cleared (Step S42). In addition, the barrel retracted area flag is set (e.g., to 1) to remember that it is at the barrel retracted position and the driving voltage of the W/Z motor 39 is switched to a certain valid voltage (Step S43). Conversely, if a leading edge is detected, not a trailing on the wide side (NO), the zoom pulse number is corrected to the pulse number for the position W2 (Step S44). As is in Step S38, the photography area flag is set (e.g., to 1) (Step S45).

Then, the control part 31 determines whether the zoom barrel has moved to reach the pulse number for the barrel retracted position or the W/Z motor 39 has stopped (Step S46). If it has not reached the pulse number for the barrel retracted position and the motor has not stopped (NO), the program returns to Step S33 and the series of steps is repeated. Conversely, if it has reached the pulse number for the barrel retracted position or the motor has stopped (YES), the driving voltage supply of the W/Z motor 39 is stopped to turn it off (Step S47). The n a determination is made as to whether any error occurs. It is assumed to be an error that the conditions of the ZPRs 13a and 13b are checked and both are found to be of a high status. If an error occurs (YES), the damage operation is performed (Step S49). If there is no error (NO), the current position information of the zoom lens barrel is stored in the memory 35 (Step S50) and the series of process routines is terminated.

Figure 9:
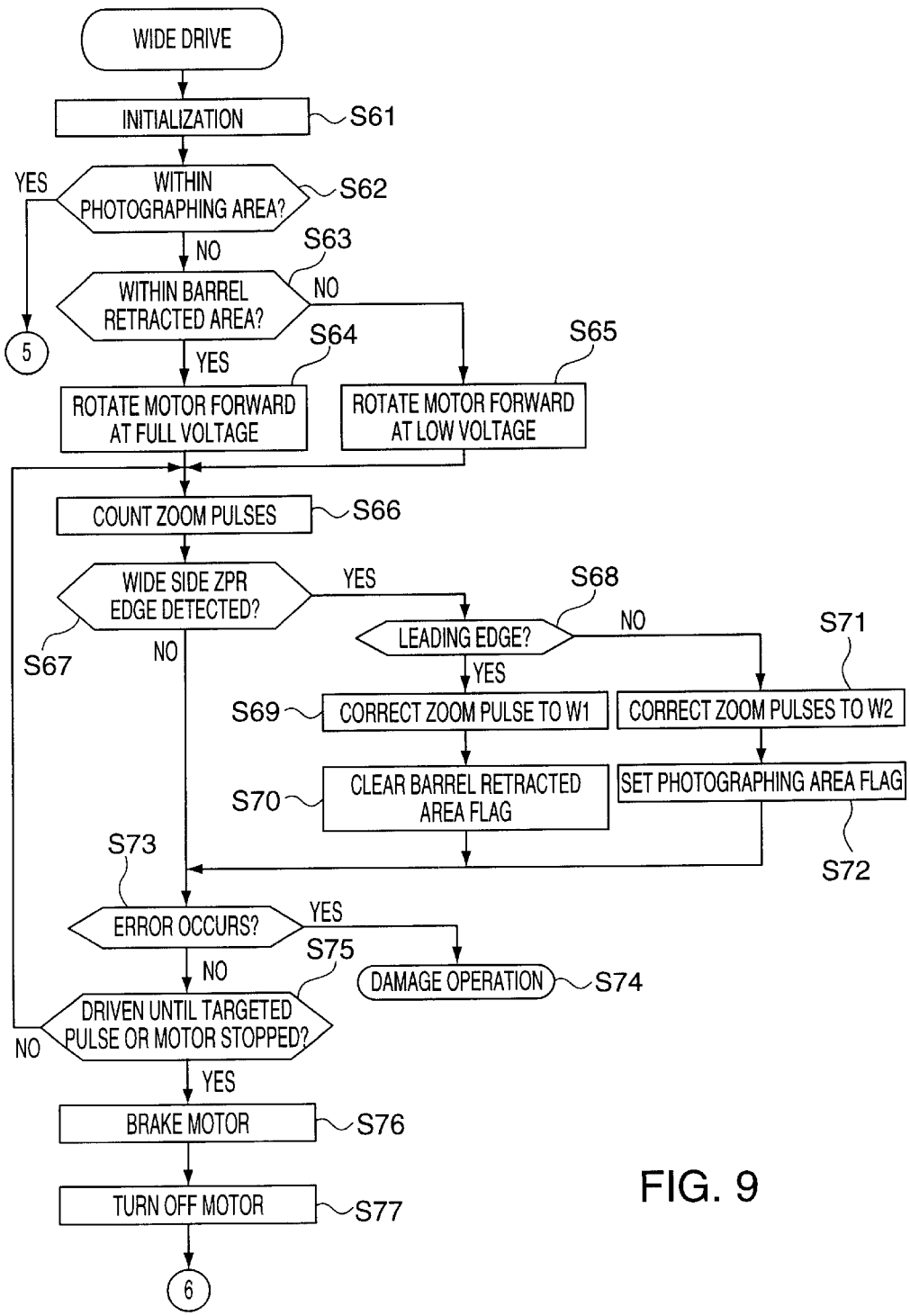
FIG. 9 is the first half of a flowchart for explaining the movement of the lens barrel from the barrel retracted position to the wide position at which photography becomes available.
Figure 10:
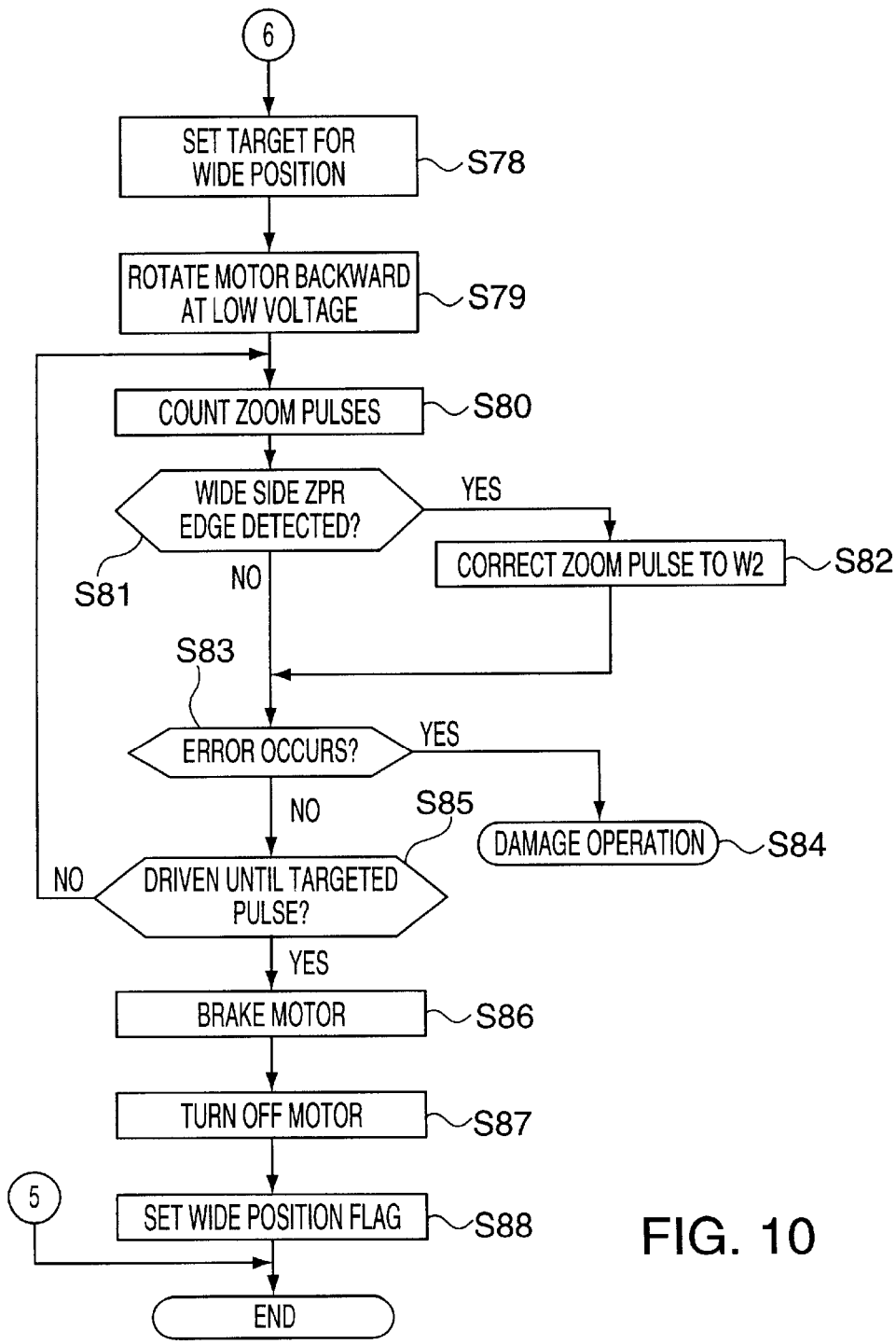
FIG. 10 is the second half of a flowchart for explaining the movement of the lens barrel from the barrel retracted position to the wide position at which photography is available.
Figure 11:
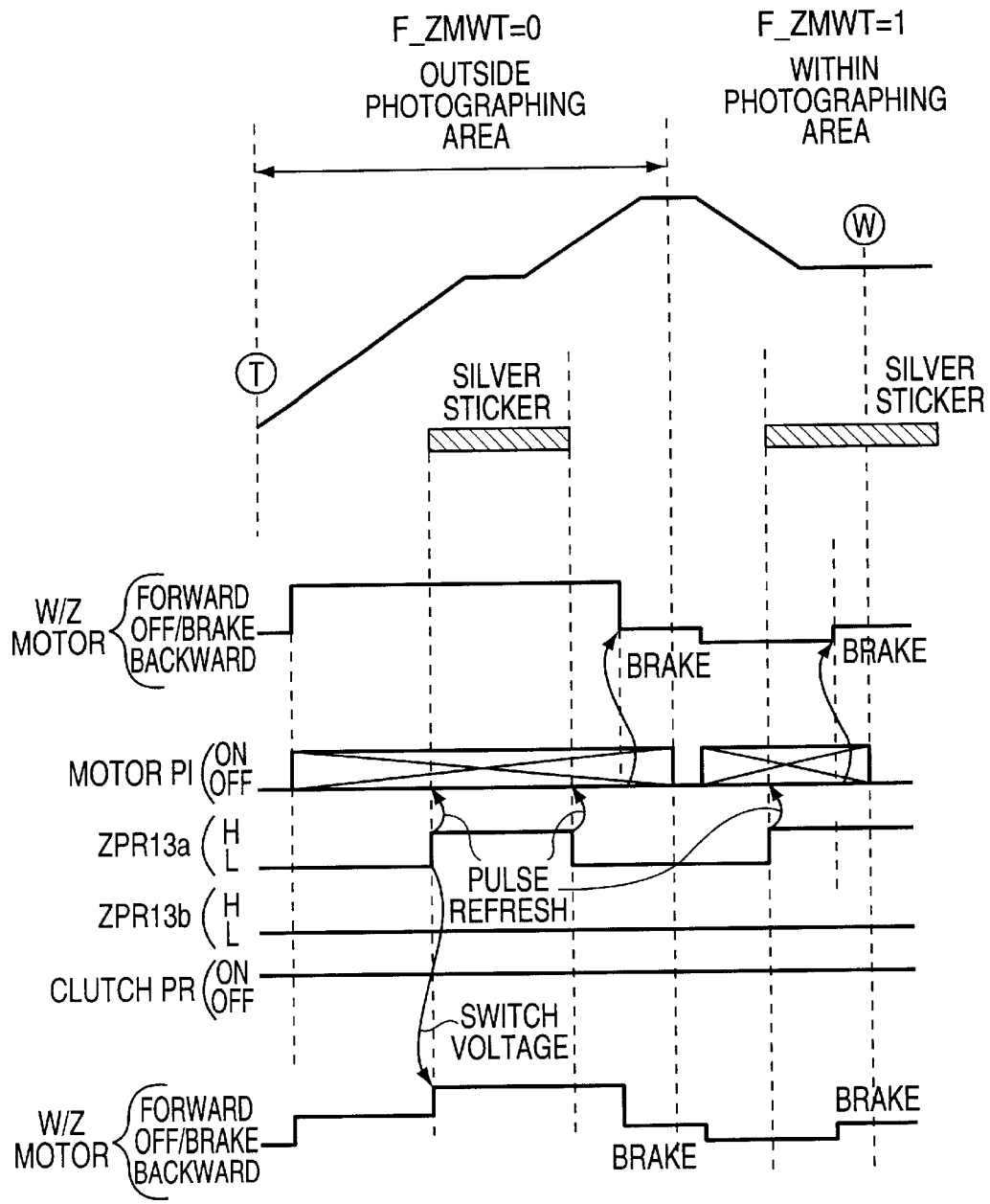
FIG. 11 is a timing chart for explaining the movement of the lens barrel from the barrel retracted position to the wide position at which photography becomes available.

The movement of the zoom lens barrel from the barrel retracted position to the photography area is described hereafter, with reference to the flowcharts shown in FIGS. 9 and 10 and a timing chart shown in FIG. 11.

First, initialization is performed (Step S61). During initialization, the control part 31 switches the driving force of the W/Z motor 39 to the zooming operation, prepares for reading ZPR 13a, ZPR 13b, and motor PI 48 is a photo-interrupter that produces pulses during a rotation of the W/Z motor 39, and sets the targeted driving pulse number for a position shifted from the wide position to the tele side by a certain number of pulses.

Then, the control part 31 determines whether the zoom lens barrel is in the photography area (Step S62). If the lens barrel is in the photography area (YES), no further operation is necessary and, therefore, the operation is terminated. Conversely, if the lens barrel is not in the photography area (NO), a determination is made as to whether the zoom lens barrel is at the barrel retracted position (Step S63). For this, the zoom position information is initialized and a determination is made as to whether a trailing edge is detected in signals from the wide side ZPR 13a as is described on the barrel retraction operation. If a trailing edge is detected (YES) and the barrel retracted area flag is 1, it is confirmed that the lens barrel is in the area A of FIG. 3 or in the barrel retracted area. Therefore, the W/Z motor 39 is rotated forward at full voltage for zooming up (Step S64). If the barrel retracted area flag is not 1 (NO), the zoom lens barrel is at an unknown position and somewhere in the areas B, C, D, or E of FIG. 3. Then, the motor is driven at a certain lower voltage than a full voltage, considering that the zoom lens barrel may hit the mechanical stop at the telephoto end, possibly damaging the driving mechanism if the zoom lens barrel is in the area E of FIG. 3 (Step S65).

Then, the control part 31 detects the zoom pulse number for the current position of the motor PI 48 and count the pulses until the targeted pulse number is obtained (Step S66). It also determines whether there is any change in the edge of signals from the wide side ZPR 13a (Step S67). If there is no change in edge of signals from the ZPR 13a (NO), the program goes to the step S73, which is described later. However, if there is any change in edge of signals from the ZPR 13a (YES), a determination is made as to whether the edge is a leading or trailing edge (Step S68). If it is a leading edge (YES), the correction is performed in which the zoom pulse number is replaced by the pulse number for the position W1 that is previously stored in the memory 35 (Step S69). After this, the barrel retracted area flag is cleared because the lens barrel has passed the barrel retracted area (Step S70). Conversely, if a leading edge is not detected (NO), assuming that a trailing edge is detected, correction is performed in which the zoom pulse number is replaced by the pulse number for the position W2 (Step 71). Subsequently, the photography area flag is set because the lens barrel has entered the photography area (Step S72).

After the barrel retracted area flag is cleared, the photography area flag is set, or it is determined that there is no edge change in signals from the wide side ZPR 13a at Step S67 above, the control part 31 determines whether any error has occurred (Step S73). It is assumed to be an error that there is no change in signals from the wide side ZPR 13a after certain number of pulses counted since the start of driving the motor. If an error is assumed (YES), damage treatment is performed in which the camera is locked (Step S74). If no error is assumed (NO), a determination is made as to whether the lens barrel is moved until the targeted pulse number is obtained after a trailing edge of signals from the wide side ZPR 13a is detected and the lens barrel has entered the photography area (Step 75). If the targeted pulse number is not obtained (NQ), then the program returns to Step S66. Conversely, if the targeted pulse number is obtained (YES), the motor is braked (Step S76) and stopped to turn off the applied driving voltage (Step 77).

Then, the control part 31 sets the drive targeted position for the pulse number for the wide position in order to stop at the wide position (Step S78). By rotating the motor backward at low voltage (Step S79), the zoom-out operation is performed until the wide position is reached. The pulse number for the current position of the motor PI 48 is detected and counted (decreased) until the targeted wide position pulse number is obtained (Step S80).

Then, it is determined whether a leading edge of a signal from the wide side ZPR 13a is detected (Step S81). If the leading edge is detected (YES), the zoom pulse number is corrected to the pulse number for the position W2 that is previously stored in the memory 35 (Step S82). If there is no change in signals of the wide side ZPR 13a (NO), the following step is performed.

Then, the control part 31 determines whether an error has occurred (Step S83). It is assumed to be an error if there is no change in signals from the wide side ZPR 13a after a certain number of pulses since the start of driving the W/Z motor 39. If an error has occurred (YES), a damage operation is performed in which the camera is locked (Step S84). If there is no error (NO), the leading edge of a signal from the wide side ZPR 13a is detected and a determination is made as to whether the zoom pulse number corresponds to the wide position (Step S85). If it does not reach the wide position (NO), the program returns to Step S80. If it has reached the wide position (YES), the motor is braked (Step S86) and then the driving power to the motor is turned off after it is confirmed that the motor is stopped (Step S87). Subsequently, because the lens barrel is stopped at the wide position, the wide position flag is set and a series of operations is terminated (Step S88).

Figure 12:
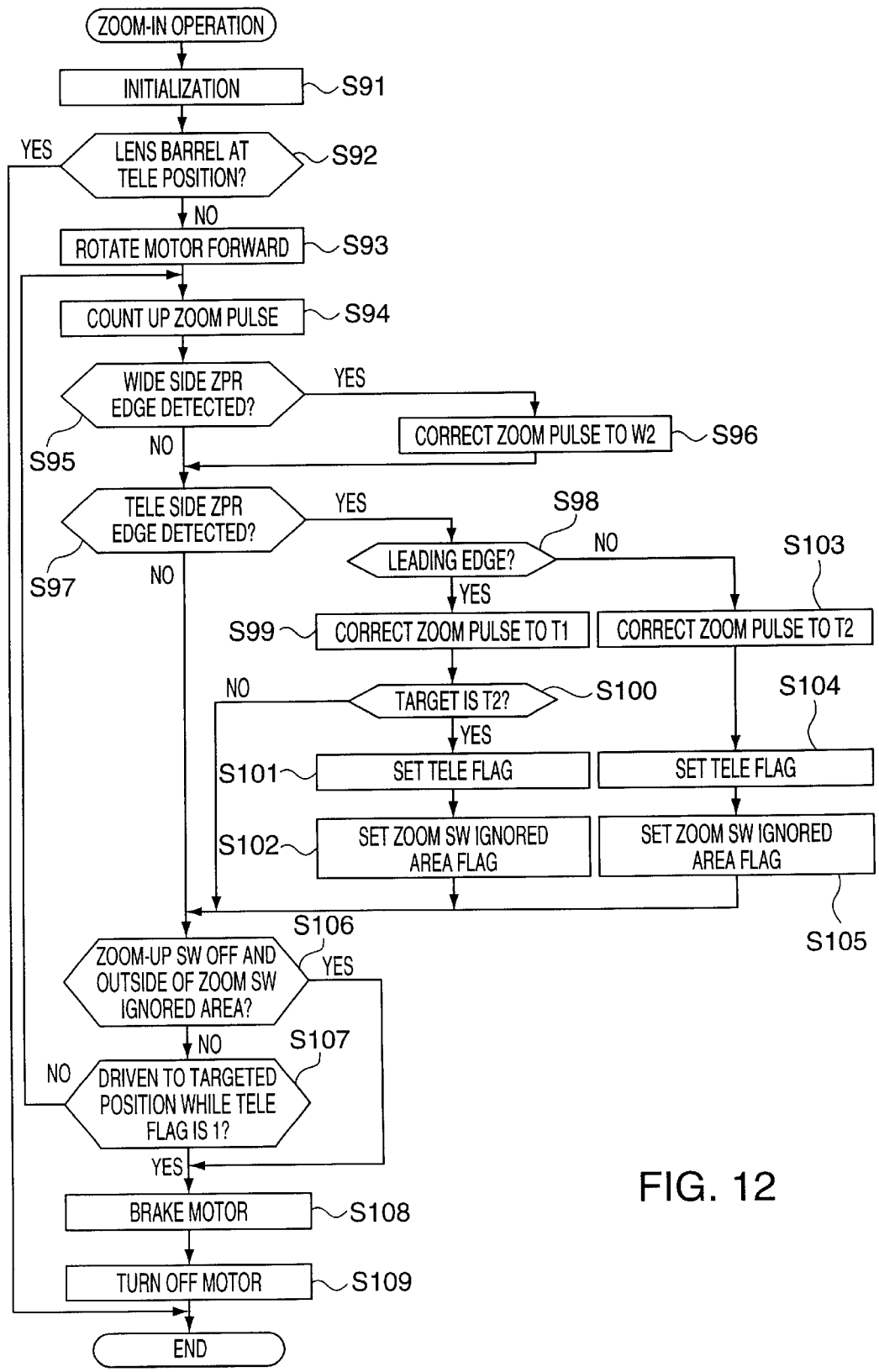
FIG. 12 is a flowchart for explaining the zoom-in movement of the lens barrel.
Figure 13:
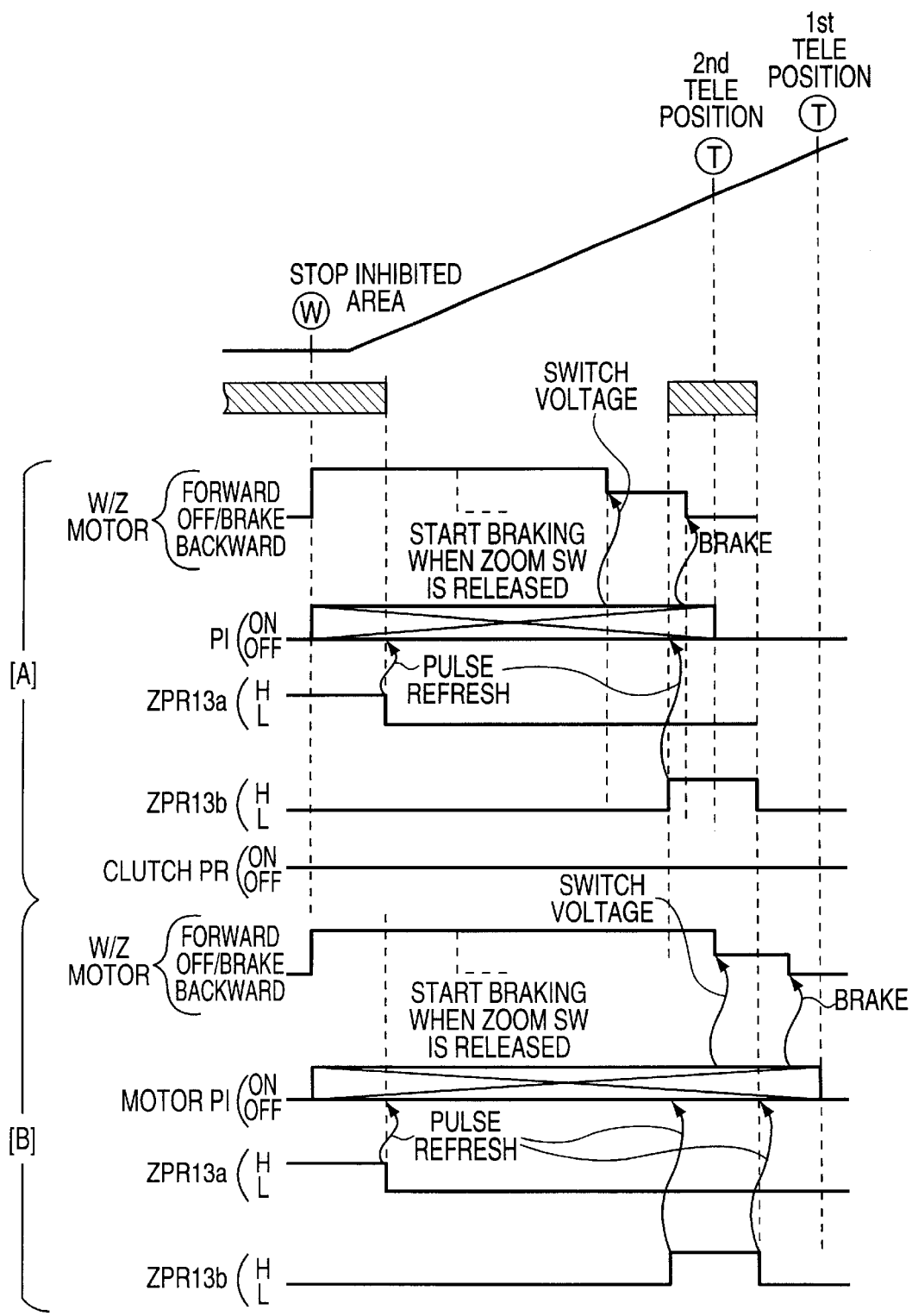
FIG. 13 is a timing chart for explaining the zoom-in movement of the lens barrel.

The zoom-in operation that is started when the zoom-in SW is operated by a user during the photographing status of the camera is described hereafter, with reference to the flowchart shown in FIG. 12 and the timing chart shown in FIG. 13. FIG. 13 shows the timing chart during the zoom-in operation: [A] (type I) corresponds to an exemplary camera having a zoom specification in which the tele position is at the second tele position in the area D of FIG. 3 and [B] (type II) corresponds to an exemplary camera having a zoom specification in which the tele position is at the first tele position in the area E of FIG. 3

First, initialization is performed (Step S91). During initialization, the control part 31 turns on the motor PI 48 and PR for zooming and sets the targeted pulse number for the tele position of the camera used (i.e. the first or second tele position). Then, a determination is made as to whether the lens barrel is at the tele position using the pulse number at which the lens barrel currently stays (Step S92). If it is currently at the tele position (YES), the operation is terminated without zooming. If it is not at the tele position (NO), the W/Z motor is rotated forward, starting the zoom-in operation (Step S93). Along with the zoom-in operation, the current pulse number of the motor PI 48 is monitored and the zoom pulses are counted up until the count reaches the tele position pulse number (Step S94). Then, a determination is made as to whether there is any change in signals from the wide side ZPR 13a (Step S95). If a change is detected in signals of the ZPR 13a (YES), the zoom pulse number is corrected to the pulse number for the position W2 (Step S96).

Then the control 31 determines whether there is any change in signals from the tele side ZPR 13b (Step S97). If any change is detected in signals from the ZPR 13b (YES), a determination is made as to whether the detected change is the leading edge (Step S98). If a leading edge of a signal from the tele side ZPR 13b is detected (YES), the zoom pulse number is corrected to the pulse number for the position T1 because the zoom lens barrel is at the position T1. The contents of the memory 35 is read and then a determination is made as to whether the tele position of the camera used is at the second tele position on the silver sticker (Step S100). If the tele position stored in the memory 35 is the second tele position (YES), the tele flag is set (Step S101) and the zoom SW ignored area flag is set (Step S102). After this routine, the zoom lens barrel is moved to the tele position regardless of the zoom SW being released. In other words, because the position T1 and the second tele position are close to each other, the zoom lens barrel is moved until the pulse number reaches the pulse number for the second tele position regardless of the zoom SW being pushed down or not. In this case, a certain pulse number is added to the pulse number for the position T1, resulting in the pulse number for the second tele position. Therefore, the zoom lens barrel is moved according to the certain number of pulses. Conversely, if the tele position stored in the memory 35 is the first tele position, Steps S101 and S102 are not performed and the zoom lens barrel is further moved. When the zoom lens barrel reaches the position T2 that is the telephoto side end of the silver sticker, the control part 31 detects a trailing edge of a signal at Step S98.

If the control part 31 detects a trailing edge at Step S98 (NO), the zoom lens barrel is at the position T2 so that the zoom pulse number is corrected to the pulse number for the position T2 (Step S103). Then, the tele flag is set (Step S104) and the zoom SW ignored area flag is set (Step S105). After this routine, the zoom lens barrel is moved to the tele position regardless of whether the zoom SW is released. In other words, because the position T2 and the first tele position are close to each other, the zoom lens barrel is moved until the pulse number reaches the pulse number for the first tele position regardless of the zoom SW being pushed down or not. In this case, a certain pulse number is added to the pulse number for the position T2, resulting in the pulse number for the first tele position. Therefore, the zoom lens barrel is moved according to the certain number of pulses.

Then, the control part 31 determines whether the zoom SW is released while the zoom SW ignored area flag is not set (Step S106). If the zoom SW is released (YES), the program goes to Step S108 to terminate the control, which is described later. Conversely, if the zoom SW is not released (NO), the tele flag is set for 1 and a determination is made as to whether the zoom lens barrel is moved to the targeted pulse number for the tele position (Step S107). However, if it has not reached the tele position (NO), return to Step S94 to continue the operation. If it has reached the tele position or the zoom SW is released (YES), the W/Z motor 39 is braked (Step S108) to terminate the operation. The driving power to the motor is turned off after the motor stops (Step S109). In this way, the zoom lens barrel can be precisely stopped at the second tele position in [D] in FIG. 3 (type I) or at the first tele position in [E] in FIG. 3 (type II).

Figure 14:
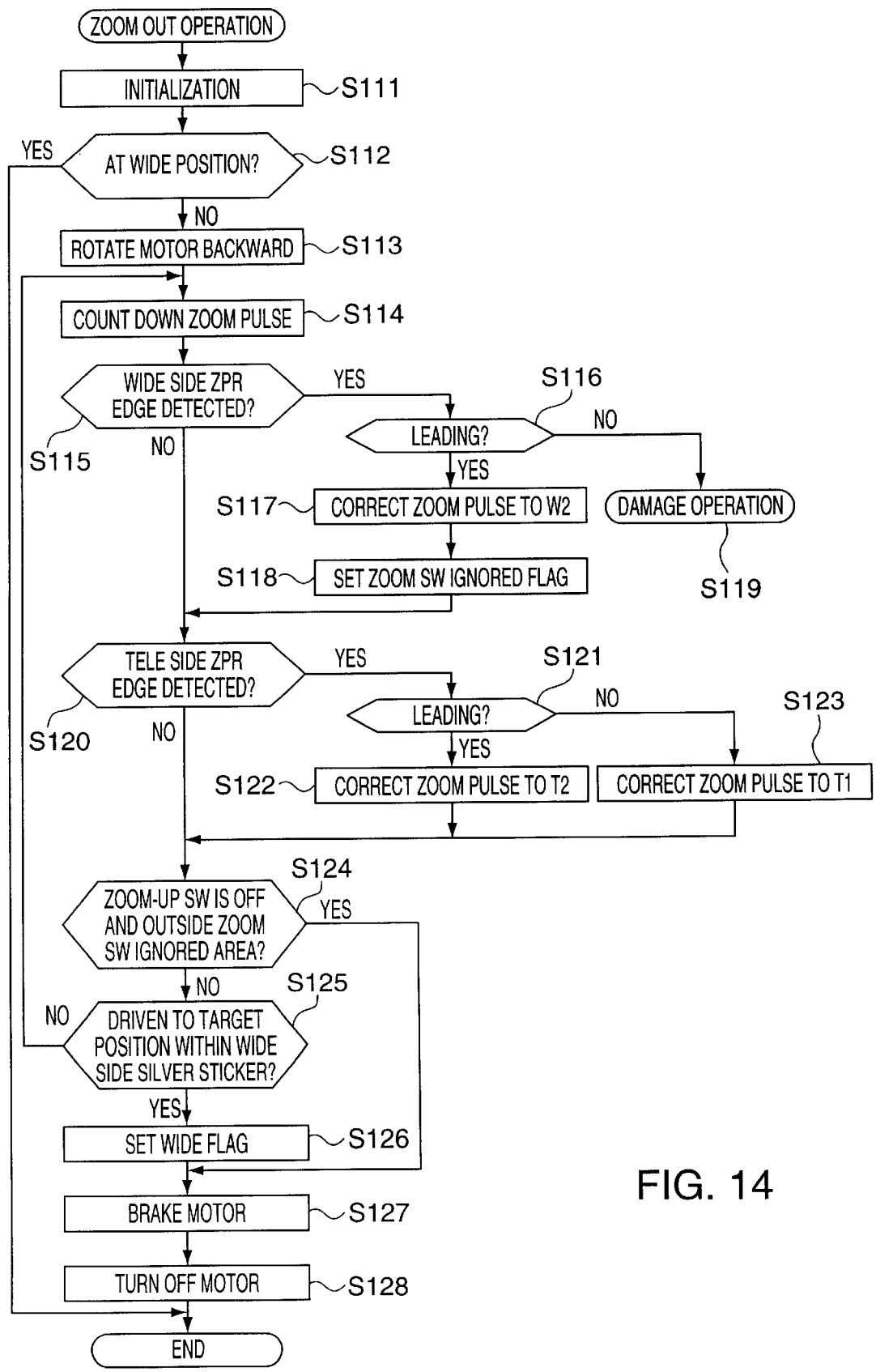
FIG. 14 is a flowchart for explaining the zoom-out movement of the lens barrel.
Figure 15:
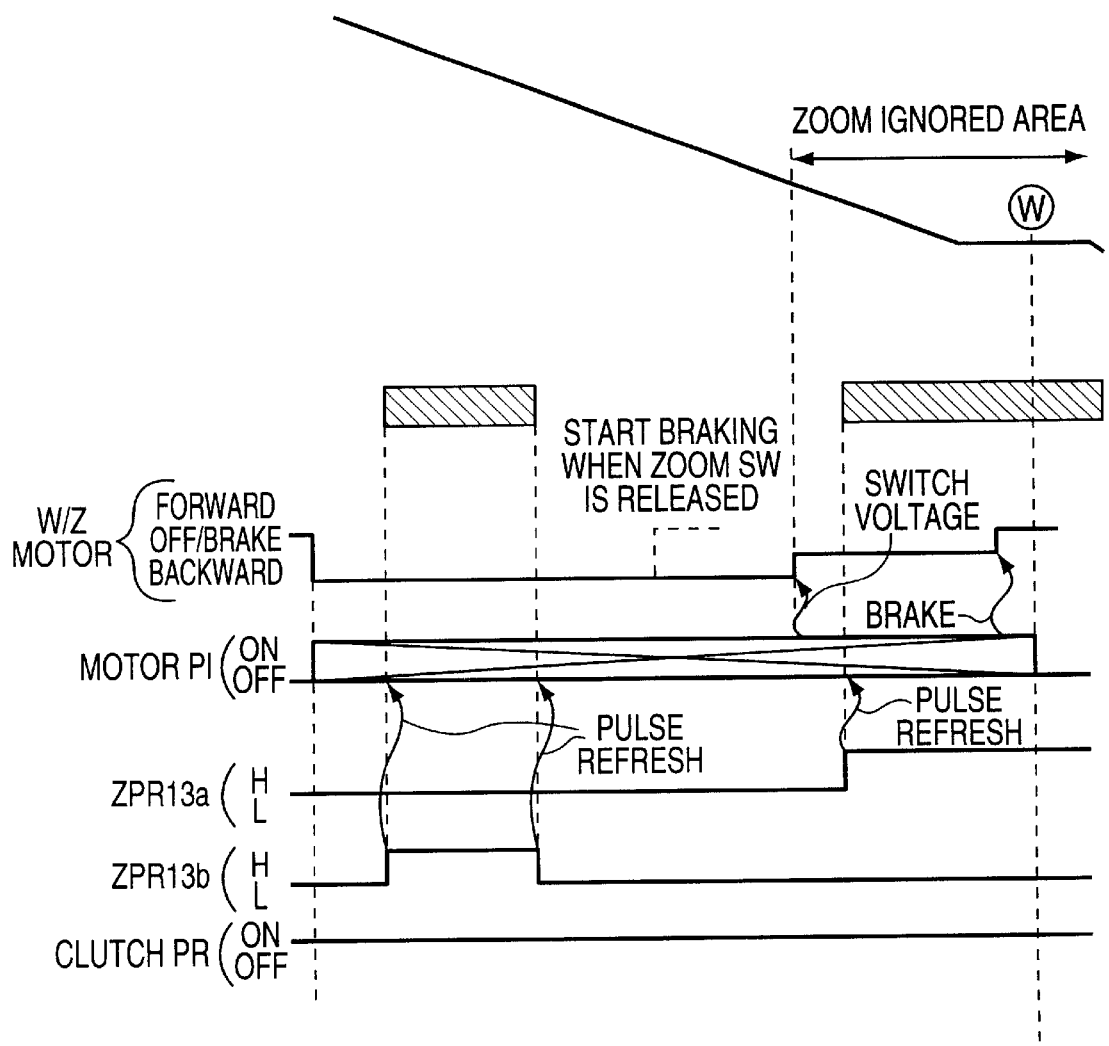
FIG. 15 is a timing chart for explaining the zoom-out movement of the lens barrel.

The zoom-out operation of the lens barrel is described hereafter, with reference to the flowchart shown in FIG. 14 and the timing chart shown in FIG. 15.

First, the control part 31 performs initialization (step S111). During initialization, the motors PI 48 and PR are turned on for zooming and a targeted pulse number is set for the pulse number for the wide position.

Then, the pulse number for the current position of the lens barrel is detected and a determination is made as to whether it is at the wide position (Step S112). If it is at the wide position (YES), the operation is terminated without zooming. However, if it is not at the wide position (NO), the motor is rotated backward to start the zoom-out operation (Step S113). During the zoom-out operation, the pulse number of the motor PI 48 is monitored and counted down until it reaches the pulse number for the wide position (Step S114).

Then, the control part 31 determines whether there is any change in signals from the wide side ZPR 13a (Step S115). If there is no change (NO), the program goes to Step S120. However, if any change is detected in output of the ZPR 13a (YES), a determination is made as to whether the change is a leading edge of a signal (Step S116). If it is not a leading edge (NO), the damage operation is performed in which the camera is locked because it is outside the photography area (Step S119). However, if the change implies a leading edge (YES), the correction is performed in which the zoom pulse number is rewritten to the pulse number for the position W2 (Step S117). Then, the zoom SW ignored area flag is set so that the lens barrel is moved to the wide position even if the zoom SW is released (Step S118).

Then, the control part 31 determines whether there is any change in signals from the tele side ZPR 13b (Step S120). If any change is detected in signals from the ZPR 13b (YES), a determination is made as to whether the change is a leading edge of a signal (Step S121). If the change implies a leading edge (YES), the zoom pulse number is corrected to the pulse number for the position T2 (Step S122). If it is not a leading edge (NO), the zoom pulse number is corrected to the pulse number for the position T1 (Step S123).

Then, the control part 31 determines whether the zoom SW is released while the zoom SW ignored area flag is not set (Step S124). If the zoom SW is released (YES), go to Step S127 to terminate the operation, which is described later. If the zoom SW is not released (NO), a determination is made as to whether the pulse number reaches the targeted pulse number for the wide position (Step S125). If the targeted pulse number is not obtained within the silver sticker (NO), the program goes to Step S114. If the targeted pulse number is obtained (YES), it is assumed that the lens barrel is moved to the wide position so that the wide flag is set (Step S126). Then, the motor is braked to terminate a series of operations (Step S127) and the driving power to the motor is turned off after the motor stops (Step 128).

What is claimed is:

1. A camera comprising:
   a zoom lens barrel for changing the focal length of a photographic optical system;
   a zooming part for driving said zoom lens barrel;
   a pulse generator art for generating pulse signals according to the movement of said zoom lens barrel;
   a counter part for increasing or decreasing the pulse number count of said pulse signals according to the moving direction of said zoom lens barrel;
   a position detection part for detecting said zoom lens barrel and producing a detection signal at certain plural positions; and
   a control part for controlling said zooming part to prevent said zoom lens barrel from moving beyond a zoom limit during zooming, wherein said control part controls said zooming part to stop the movement of the zoom lens barrel after both:
   (1) said position detection part detects said zoom lens barrel at the position closest to said zoom limit among said certain plural positions; and
   (2) said counter part counts a certain number of pulses that corresponds to the movement of said zoom lens barrel from said position closest to said zoom limit after the detection above.

2. The camera according to claim 1 further comprising
   a memory for storing said closest certain position and said certain pulse number or information from which these are induced,
   wherein said control part performs said controls based on the stored information in said memory.

3. A camera comprising:
   a zoom lens barrel or changing the focal length of a photographic optical system, wherein a moving range of said zoom lens barrel includes a first tele position near the telephoto end and a second tele position that is on the wide-angle side of said first tele position;
   a zooming part for driving said zoom lens barrel;
   a pulse generator part for generating pulse signals according to the movement of said zoom lens barrel;
   a counter part for increasing or decreasing the pulse number count of said pulse signals according to the moving direction of said zoom lens barrel;
   a position detection part for detecting said zoom lens barrel when said zoom lens barrel is at certain positions, said position detection part outputs a first position signal when said zoom lens barrel is at a first certain position between said first and second tele positions and a second position signal when said zoom lens barrel is at a second certain posit on that is on the wide-angle side of said second tele position; and
   a control part for controlling said zooming part based on the pulse signals produced by said pulse generator part and said outputs of said position detection part, wherein the control part control said zooming part based on said first position signal for topping the zoom lens barrel at said first tele position and based on said second position signal for stopping the zoom lens barrel at said second tele position.

4. The camera according to claim 3 further comprising
   a memory that stores information for specifying which is used as zoom-in limit, said first tele position or second tele position, during the zoom-in operation of said zoom lens barrel,
   wherein said control part controls, said zoom lens barrel not to move to the telephoto side of said first tele position during the zoom-in operation of said zoom lens barrel when said memory stores information that specifies said first tele position as the zoom-in limit, and
   wherein control part controls said zoom lens barrel not to move to the telephoto side of said second tele position during the zoom-in operation of said zoom lens barrel when said memory stores information that specifies said second tele position as the zoom-in limit.

5. The camera according to claim 3 wherein
   said position detection part includes an optical detection device and a highly reflective member disposed on a member which moves in association with the movement of said zoom lens barrel; and
   wherein said first certain position is at the telephoto side end of said highly reflective member and said second certain position is at the wide-angle side end of said highly reflective member.

6. The camera according to claim 5 wherein
   said member is a rotating ring which rotates in association with movement of said zoom lens barrel.

7. The camera according to claim 5 wherein
   said control part determines that said zoom lens barrel has reached said first tele position when said counter part counts said certain pulse number after said optical detection device detects said telephoto side end of said highly reflective member while said zoom lens barrel moves in the direction from the wide-angle end to telephoto end; and
   wherein said control part determines that said zoom lens barrel has reached said second tele position when said counter part counts said certain pulse number after said optical detection device detects said wide-angle side end of said highly reflective member while said zoom lens barrel moves in the direction from the wide-angle end to telephoto end.

8. The camera according to claim 7 wherein
   said wide-angle side end of said highly reflective member is detected by detecting a leading edge of an output signal of said optical detection device.

9. The camera according to claim 7 wherein
   said telephoto side end of said highly reflective member is detected by detecting a trailing edge of an output signal of said optical detection device.

10. A camera comprising:
    a zoom lens barrel for changing the focal length of a photographic optical system, a moving range of said zoom lens barrel includes a first wide position near a wide-angle end and a second wide position on a telephoto side of said first wide position;
    a zooming part for driving said zoom lens barrel;
    a pulse generator art for generating pulse signals according to the movement of said zoom lens barrel;
    a counter part for increasing or decreasing the pulse number count of said pulse signals according to the moving direction position of said zoom lens barrel;

a position detection part for detecting said lens barrel when said zoom lens barrel is at certain positions, said position detection part outputs a first position signal when said zoom lens barrel is at a first certain position between said first and second wide positions and a second position signal when said zoom lens barrel is at a second certain position that is on the telephoto side of said second wide position; and a control part or controlling said zooming part based on said pulse signal produced by said pulse generator part and said outputs of aid position detection part, wherein the control part controls said zooming part based on said first position signal for stopping said zoom lens barrel at said first wide position and based on said second position signal for stopping said zoom lens barrel at said second wide position.

11. The camera according to claim 10 wherein said position detection part includes an optical detection device and a highly reflective member disposed on a member in association with which said zoom lens barrel moves, and wherein said first certain position is at the telephoto side end of said highly reflective member and said second certain position is at the wide-angle side end of it.

12. The camera according to claim 10 further comprising:

a memory that stores information for specifying which is used as zoom-out limit, said first wide position or second wide position, during the zoom-out operation of said zoom lens barrel, wherein said control part controls said zoom lens barrel not to move to the wide-angle side of said first wide position during the zoom-out operation of said zoom lens barrel when said memory stores information that specifies said first wide position as the zoom-out limit, and wherein said control part controls said zoom lens barrel not to move to the wide-angle side of said second wide position during the zoom-out operation of said zoom lens barrel when said memory stores information that specifies said second wide position as the zoom-out limit.

13. The camera according to claim 11 wherein said member is a rotating ring which rotates in association with movement of said zoom lens barrel.

14. The camera according to claim 11 wherein said control part determines that said zoom lens barrel has reached said second wide position when said counter part counts said certain number of pulses after said optical detection device detects said telephoto side end of said highly reflective member while said zoom lens barrel moves in the direction from the telephoto end to wide-angle end, and wherein said control part determines that said zoom lens barrel has reached said first wide position when said counter part counts said certain number of pulses after said optical detection device detects said wide-angle side end of said highly reflective member while said zoom lens barrel moves in the direction from the telephoto end to wide-angle end.

15. The camera according to claim 14 wherein said telephoto side end of said highly reflective member is detected by detecting a leading edge of an output signal of said optical detection device.

16. The camera according to claim 14 wherein said wide-angle side end of said highly reflective member is detected by detecting a trailing edge of an output signal of said optical detection device.

17. A method for controlling a camera in which a zoom lens barrel is driven and controlled, which zoom lens barrel can be mounted in various types of zoom cameras having different focal length ranges, the method comprising:

reading from memory, stored data of at least one of telephoto side zoom limit position and wide-angle side zoom limit position particular to the optical zoom system as a targeted stop position;

counting pulse signals that are output in association with the movement of said zoom lens barrel by increasing or decreasing a count of them based on the moving direction of said zoom lens barrel;

detecting a reference signal that is output at a reference position near the targeted stop position;

correcting the count number counted at said counting step to the number corresponding to said reference position when said reference signal is detected; and stopping said zoom lens barrel at said targeted stop position based on the corrected count number.

18. A zooming optical device comprising:

a frame at least movable between the wide-angle end and the telephoto end of a zoom optical system retained in the frame;

at least one marker, disposed on the frame, for indicating at least one predetermined frame position;

a marker detector configured to detect the at least one marker;

a pulse counter configured to count a control pulse generated in response to movement of the frame, the pulse counter being set to a first predetermined count value in response to an output from the marker detector; and a controller, configured to stop the movement of the frame when the count of the pulse counter reaches a second predetermined count value after the setting of the pulse counter to the first predetermined count value.

19. The zooming optical device according to claim 18, wherein the at least one marker is disposed at a vicinity position of the telephoto end.

* * * * *